(12) United States Patent
Lee

(10) Patent No.: US 11,904,461 B2
(45) Date of Patent: Feb. 20, 2024

(54) PAYLOAD TRANSPORTATION DEVICE

(71) Applicant: MOTION DEVICE INC., Anyang-si (KR)

(72) Inventor: Jong Chan Lee, Anyang-si (KR)

(73) Assignee: MOTION DEVICE INC., Anyang-si (KR)

( * ) Notice: Subject to any disclaimer, the term of this patent is extended or adjusted under 35 U.S.C. 154(b) by 763 days.

(21) Appl. No.: 17/043,631

(22) PCT Filed: Jul. 22, 2020

(86) PCT No.: PCT/KR2020/009652
§ 371 (c)(1),
(2) Date: Sep. 29, 2020

(87) PCT Pub. No.: WO2021/230423
PCT Pub. Date: Nov. 18, 2021

(65) Prior Publication Data
US 2023/0191589 A1  Jun. 22, 2023

(30) Foreign Application Priority Data
May 15, 2020  (KR) ......................... 10-2020-0058056

(51) Int. Cl.
*B66F 9/065* (2006.01)
*B25J 5/00* (2006.01)
*B66F 9/20* (2006.01)

(52) U.S. Cl.
CPC ............... *B25J 5/007* (2013.01); *B66F 9/065* (2013.01); *B66F 9/205* (2013.01)

(58) Field of Classification Search
CPC .......... B66F 9/063; B66F 9/065; B66F 9/205
See application file for complete search history.

(56) References Cited

U.S. PATENT DOCUMENTS 6,390,213 B1 * 5/2002 Bleicher .............. A61G 1/0218
280/124.179
9,707,879 B2 * 7/2017 Mecklinger ............. B66F 9/063
(Continued)

FOREIGN PATENT DOCUMENTS

JP  7137871 B2 *  9/2022  ........... B60B 35/003
KR  101642728 B1   7/2016
(Continued)

*Primary Examiner* — Kaitlin S Joerger
(74) *Attorney, Agent, or Firm* — STIP Law Group, LLC

(57) ABSTRACT

Disclosed is a payload transportation device for transporting a payload, which has a low height and in which driving wheels are configured to come into constant contact with a ground surface even when the ground surface is uneven. The payload transportation device includes a loading plate above which a payload is loaded, a lift-driving portion configured to generate a driving force to vertically lift the loading plate, a first assembly configured to support a bottom of one side of the loading plate and in which some components included in the lift-driving portion are provided, a second assembly configured to support a bottom of the other side of the loading plate and in which other components included in the lift-driving portion are provided, hinge portions configured to connect the first assembly to the second assembly in a hinge structure, at least a pair of driving wheels coupled to both sides of a bottom of any one of the first assembly and the second assembly, and a driving unit configured to rotate the driving wheels.

12 Claims, 19 Drawing Sheets

(56) References Cited

U.S. PATENT DOCUMENTS

| | | | |
|---|---|---|---|
| 9,971,351 B2* | 5/2018 | Deutscher | G05D 1/0011 |
| 2016/0209847 A1* | 7/2016 | Kuegle | B66F 9/063 |
| 2016/0231751 A1* | 8/2016 | Mecklinger | G05D 1/0297 |
| 2016/0340162 A1* | 11/2016 | Standard | B62B 5/00 |

FOREIGN PATENT DOCUMENTS

| | | | | |
|---|---|---|---|---|
| KR | 101772631 B1 | 9/2017 | | |
| WO | WO-2020049960 A1 * | 3/2020 | | B60P 1/02 |

* cited by examiner

PAYLOAD TRANSPORTATION DEVICE

CROSS-REFERENCE TO RELATED APPLICATIONS

This application is the U.S. National Phase under 35 U.S.C. § 371 of International Application No. PCT/KR2020/009652 filed on Jul. 22, 2020, which in turn claims the benefit of Korean Application No. 10-2020-0058056, filed on May 15, 2020, the disclosures of which are incorporated by reference into the present application.

BACKGROUND

1. Field of the Invention

The present invention relates to a payload transportation device, and more particularly, to a payload transportation device capable of transporting a payload to another place.

2. Discussion of Related Art

Recently, as the distribution industry has grown at a rapid pace, a variety of distribution systems have been developed. As an example, productivity is improved by increasing the efficiency of distribution management using load transportation robots.

Such load transportation robots linearly move while a payload is loaded thereon due to a driving motor and lift a loading plate, on which the payload is loaded, using a lifting motor.

In order to lift the loading plate and the payload using the lifting motor, a complicated power transmission structure is necessary.

As a related art, a conventional load transportation robot is disclosed in Korean Patent Registration No. 10-1772631. Also, a load transportation system using a robot is disclosed in Korean Patent Registration No. 10-1642728.

A loading plate is provided above the robot of the load transportation system, and the robot is driven using driving wheels while items to be transported are loaded on the loading plate.

A pair of such driving wheels are provided on left and right sides of the robot, and casters are provided, as driven wheels, below a front side and a rear side.

When driving is performed by rotating driving wheels as described above, it is impossible to transmit a driving force of a driving portion to the driving wheels because the driving wheels can not come into contact with the ground when the ground is an uneven surface.

SUMMARY OF THE INVENTION

The present invention is directed to providing a payload transportation device for transporting a payload in which driving wheels are configured to come into contact with the ground surface constantly even when a ground surface is uneven, the payload is stably liftable using one lift-driving unit, and a height of the payload transportation device is low.

The present invention is also directed to providing a payload transportation device allowing lifting positions of a first assembly and a second assembly to coincide with each other.

The present invention is also directed to providing a payload transportation device configured to absorb eccentricity and a deviation angle which are generated between a rotational shaft of the first assembly and a rotational shaft of the second assembly in the first assembly and the second assembly.

The present invention is also directed to providing a payload transportation device with no limitation in a rotational angle of cam members of a lift-driving portion.

According to an aspect of the present invention, there is provided a payload transportation device including a loading plate (110) above which a payload is loaded, a lift-driving portion (200) configured to generate a driving force to vertically lift the loading plate, a first assembly (1) configured to support a bottom of one side of the loading plate and in which some components included in the lift-driving portion (200) are provided, a second assembly (2) configured to support a bottom of the other side of the loading plate and in which other components included in the lift-driving portion (200) are provided, hinge portions (3a, 3b) configured to connect the first assembly (1) to the second assembly (2) in a hinge structure, at least a pair of driving wheels (341, 342) coupled to both sides of a bottom of any one of the first assembly (1) and the second assembly (2), and a driving unit configured to rotate the driving wheels (341, 342).

The lift-driving portion (200) may include a lift-driving unit (210) configured to generate a driving force to vertically lift the loading plate, a first power transmission portion (230) configured to transmit the driving force of the lift-driving unit (210) to apply a vertical lifting force to one side of the bottom of the loading plate, and a second power transmission portion (250) configured to transmit the driving force of the lift-driving unit (210) to apply a vertical lifting force to the other side of the bottom of the loading plate.

The first power transmission portion may include rotational shafts (231-1, 231-2) rotated by the driving force of the lift-driving unit (210), cam members (232, 233) rotated by the rotational shafts (231-1, 231-2), and lifting members (235, 236) configured to linearly move upward or downward due to rotations of the cam members (232, 233). Also, the second power transmission portion may include rotational shafts (251-1, 251-2) rotated by the driving force of the lift-driving unit (210), cam members (252, 253) rotated by the rotational shafts (251-1, 251-2), and lifting members (255, 256) configured to linearly move upward or downward due to rotations of the cam members (252, 253).

A deceleration portion (220) configured to reduce a rotation speed of the lift-driving unit (210) may be provided. Here, the deceleration portion (220), the first power transmission portion (230), and the second power transmission portion (250) may be formed in a shape of the letter H so that four edges of the loading plate may be lifted by the driving force of the lift-driving unit (210).

The deceleration portion (220) may include a first decelerator (221) connected to a motor shaft of the lifting motor and configured to transmit rotation of the lifting motor to rotational shafts (226-1, 226-2, 226-3) which meet the motor shaft at a right angle, a second decelerator (222) connected to one end of the rotational shafts (226-1, 226-2, 226-3) and configured to transmit rotations of the rotational shafts (226-1, 226-2, 226-3) to rotational shafts (231-1, 231-2) of the first power transmission portion (230), which meet the rotational shafts (226-1, 226-2, 226-3) at a right angle, and a third decelerator (223) connected to the other end of the rotational shafts (226-1, 226-2, 226-3) and configured to transmit the rotations of the rotational shafts (226-1, 226-2, 226-3) to rotational shafts (251-1, 251-2) which meet the rotational shafts (226-1, 226-2, 226-3) at a right angle and are provided, to be parallel, at positions facing the rotational shafts (231-1, 231-2).

The lift-driving portion (200) may further include a deceleration portion (220) having one end, to which the first power transmission portion (230) is connected, and having the other end, to which the second power transmission portion (250) is connected, and configured to reduce a rotational speed of the lift-driving unit (210). Here, the deceleration portion (220) and the first power transmission portion (230) may be provided in the first assembly (1), and the second power transmission portion (250) may be provided in the second assembly (2).

A first assembly housing configured to support the some components included in the lift-driving portion (200) may be provided in the first assembly (1), and a second assembly housing configured to support the other components included in the lift-driving portion (200) may be provided in the second assembly (2). Here, the hinge portions (3a, 3b) may hinge-connect the first assembly housing to the second assembly housing to be relatively rotatable.

The lift-driving portion may include a lift-driving unit (210) configured to generate a rotational force to vertically lift the loading plate. Here, at least one pair of rotational shafts (226-1, 226-2) configured to transmit a rotational force of the lift-driving unit (210) to the components included in the lift-driving portion (200) provided in the second assembly (2) may be provided in the first assembly (1). Also, a first coupler (227) configured to allow a position of the loading plate being lifted by the first assembly (1) to coincide with a position of the loading plate being lifted by the second assembly (2) and then to couple the pair of rotational shafts (226-1, 226-2) may be connected between the pair of rotational shafts.

The first coupler (227) may include a plurality of internal pressurizing members (227-5, 227-6) configured to come into contact with outer surfaces of the pair of rotational shafts (226-1, 226-2) and to each have a wedge-shaped outer surface, and a plurality of external pressurizing members (227-3, 227-4) having wedge-shaped inner surfaces to come into contact with the wedge-shaped outer surfaces of the internal pressurizing members (227-5, 227-6). Here, when the external pressurizing members (227-3, 227-4) are moved in an axial direction of the rotational shafts (226-1, 226-2), the internal pressurizing members (227-5, 227-6) may pressurize the rotational shafts (226-1, 226-2) in a radial direction so that the pair of rotational shafts (226-1, 226-2) may be coupled.

The lift-driving portion may include a lift-driving unit (210) configured to generate a rotational force to vertically lift the loading plate. Here, at least one pair of rotational shafts (226-2, 226-3) configured to transmit the rotational force of the lift-driving unit (210) to the components included in the lift-driving portion (200) provided in the second assembly (2) may be provided in the first assembly (1)

A second coupler (228) configured to absorb a deviation angle at which the pair of rotational shafts (226-2, 226-3) deviate from an axial direction while absorbing eccentricity of the pair of rotational shafts (226-2, 226-3) in a lateral direction perpendicular to the axial direction may be connected between the pair of rotational shafts (226-2, 226-3).

The lift-driving portion may include a lift-driving unit (210) configured to generate a rotational force to vertically lift the loading plate. Here, rotational shafts (226-1, 226-2, 226-3) configured to transmit the rotational force of the lift-driving unit (210) to the components included in the lift-driving portion (200) provided in the second assembly (2) may be provided in the first assembly (1), and a decelerator (223) configured to reduce a rotational speed transmitted from the rotational shafts (226-1, 226-2, 226-3) may be provided in the second assembly (2). Also, the rotational shafts (226-1, 226-2, 226-3) may be connected to a slide groove (223a) of the decelerator (2230) to transmit the rotational force while sliding in an axial direction.

The lift-driving portion may include a lift-driving unit (210) configured to generate a rotational force to vertically lift the loading plate, a first power transmission portion (230) in which cam members (232, 233) rotated by the rotational force of the lift-driving unit (210) and each including a cam protruding portion protruding from a position eccentric from a center and a guide groove in which the cam protruding portion is inserted are formed to apply a vertical lifting force to one side of a bottom of the loading plate due to lifting members (235, 236) linearly moving upward or downward when the cam members (232, 233) rotate and which is provided in the first assembly (1), and a second power transmission portion (250) in which cam members (252, 253) rotated by the rotational force of the lift-driving unit (210) and each including a cam protruding portion protruding from a position eccentric from a center and a guide groove in which the cam protruding portion is inserted are formed to apply a vertical lifting force to the other side of the bottom of the loading plate due to lifting members (255, 256) linearly moving upward or downward when the cam members (252, 253) rotate and which is provided in the second assembly. Also, when the cam members (232, 233) and the cam members (252, 253) rotate 360 degrees, positions of the cam protruding portions of in the guide grooves vary.

A pair of first driven wheels (343a, 343b) may be coupled to a bottom surface of the first assembly (1), and a pair of second driven wheels (344a, 344b) may be coupled to a bottom surface of the second assembly (2). Here, the driven wheel (343a) on one side and the driven wheel (343b) on the other side, which are included in the pair of first driven wheels (343a, 344b), may be pivotable about a driven wheel central shaft (345) having a length in a direction perpendicular to hinge shafts (350a, 350b). Also, the driven wheel (344a) on one side and the driven wheel (344b) on the other side, which are included in the pair of second driven wheels (344a, 344b), may be pivotable about a driven wheel central shaft (346) having a length in a direction perpendicular to the hinge shafts (350a, 350b).

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
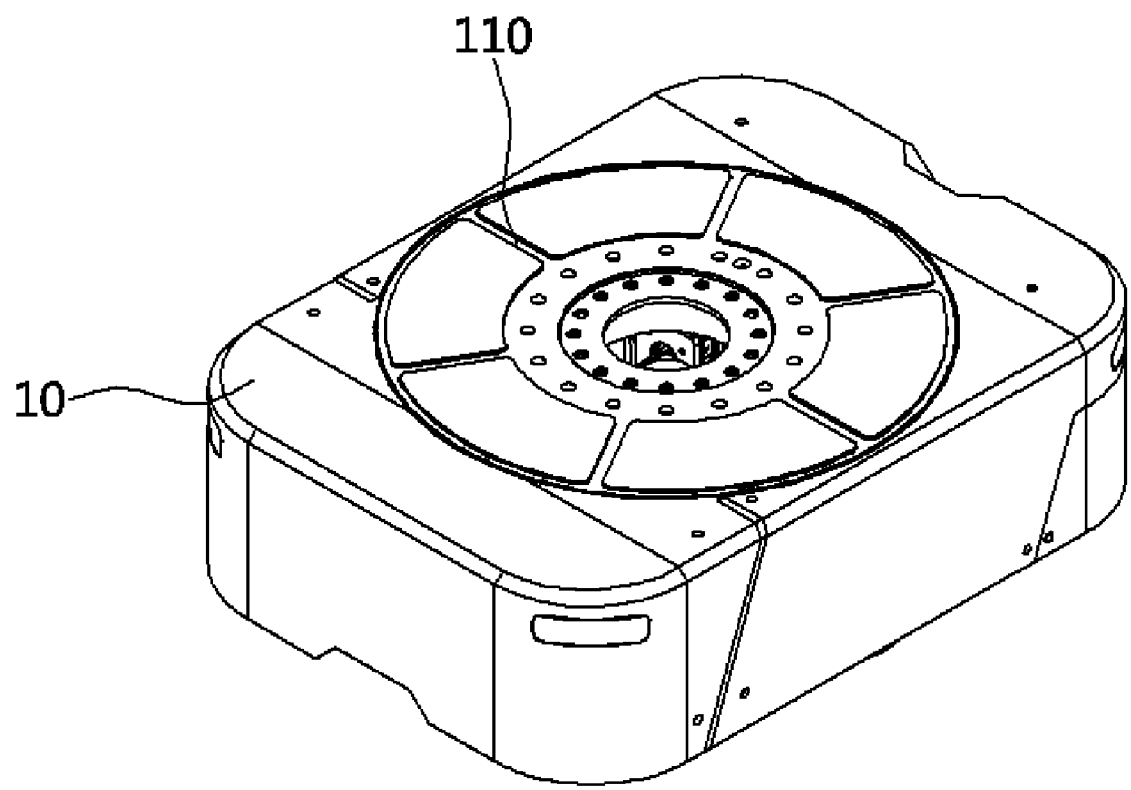
FIG. 1 is a perspective view of a payload transportation device according to the present invention.
Figure 2:
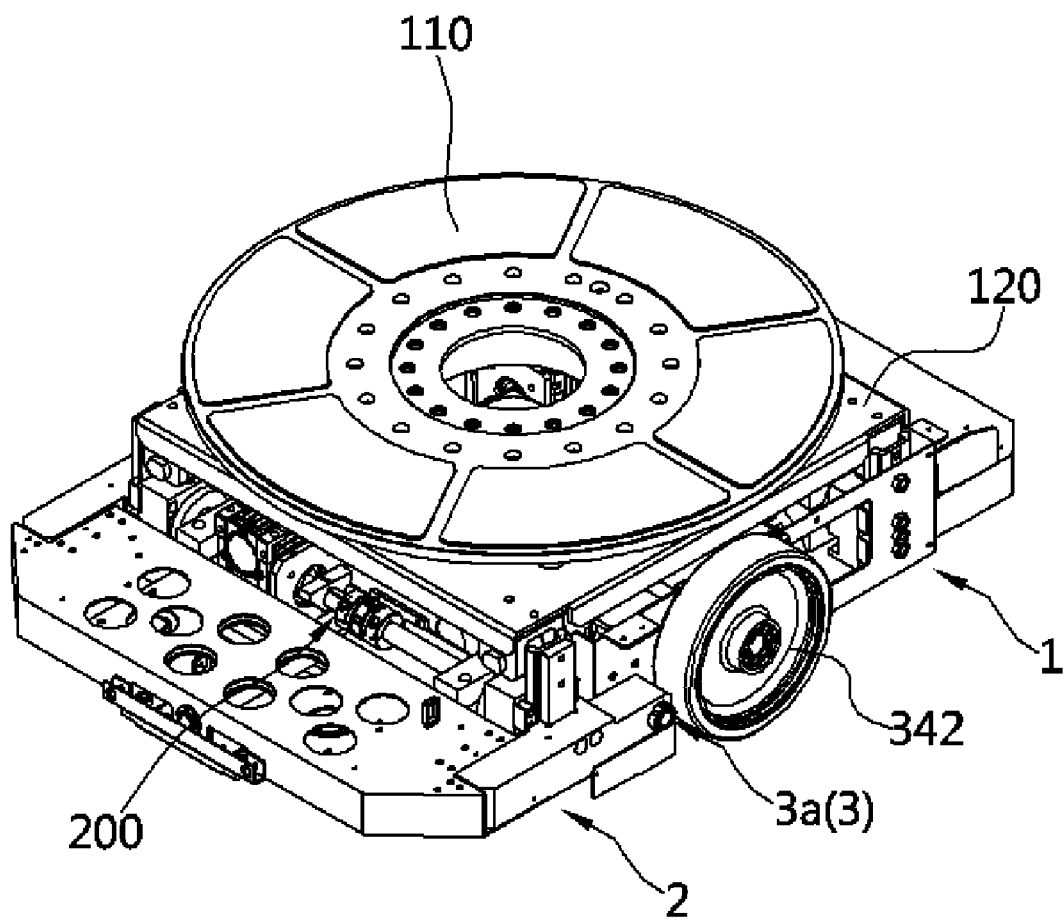
FIG. 2 is a perspective view illustrating a state in which an external cover is removed from that shown in FIG. 1.
Figure 3:
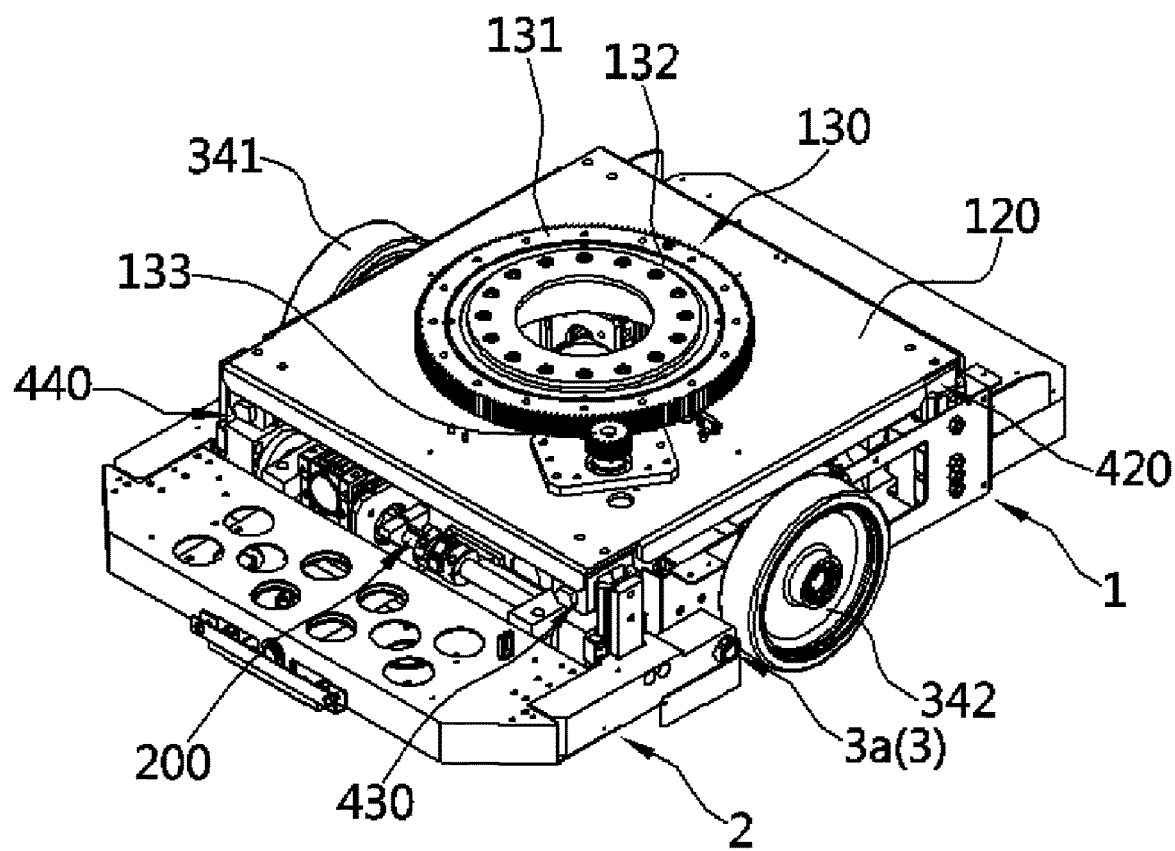
FIG. 3 is a perspective view illustrating a state in which a loading plate is removed from that shown in FIG. 2.
Figure 4:
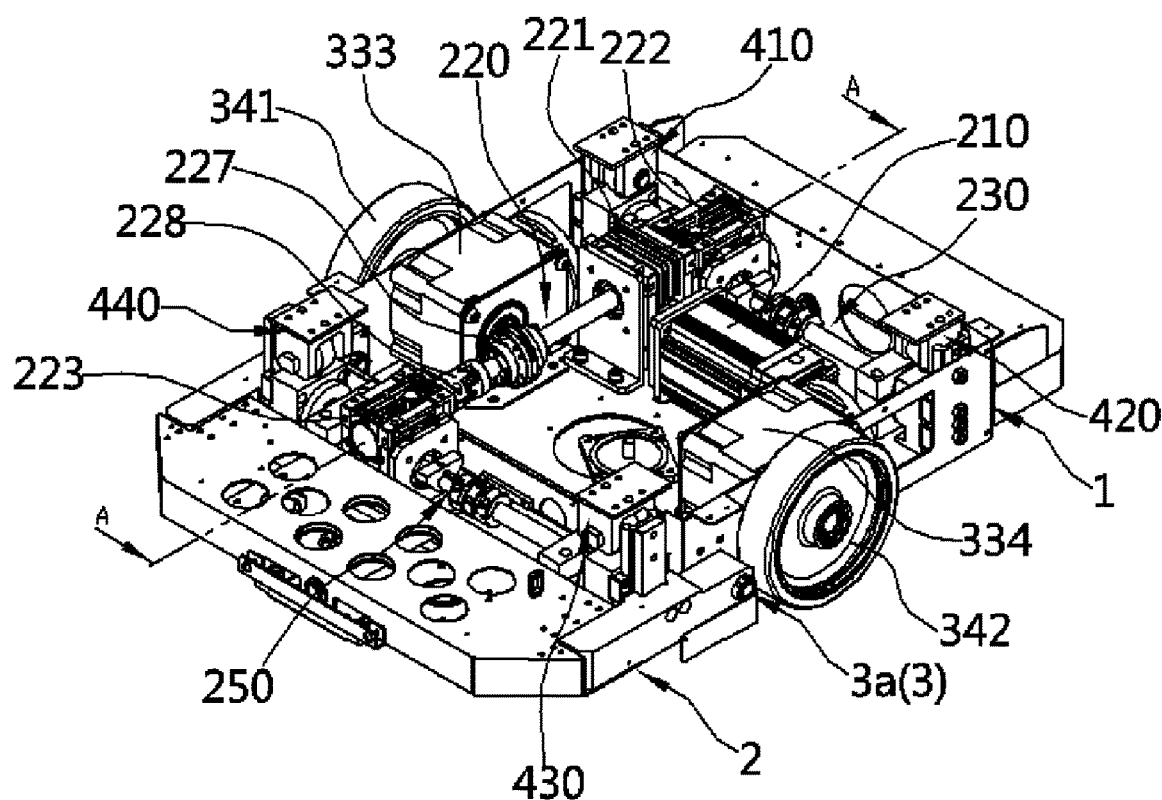
FIG. 4 is a perspective view illustrating a state in which a rotation-driving portion and an upper support plate are removed from that shown in FIG. 3.
Figure 5:
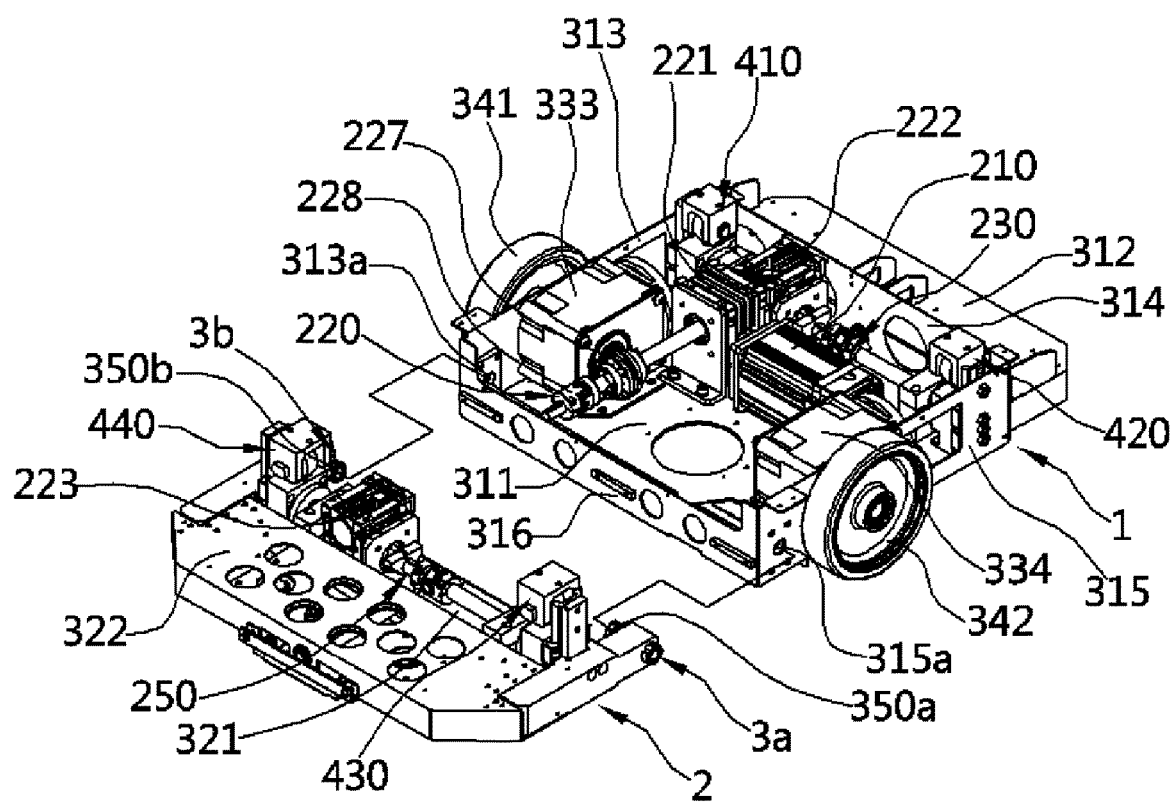
FIG. 5 is a perspective view illustrating a state in which a first assembly and a second assembly are separated from that shown in FIG. 4.

Hereinafter, the present invention will be described in detail with reference to the attached drawings.

A payload transportation device according to the present invention may be applied to a load transportation robot and is applicable to a variety of other industrial fields.

Referring to FIGS. 1 to 5, the payload transportation device according to the present invention includes a loading plate 110 on which a payload is loaded, a lift-driving portion 200 configured to vertically lift the loading plate 110, a first assembly 1 in which some components included in the lift-driving portion 200 are provided, a second assembly 2 in which other components included in the lift-driving portion 200 are provided, hinge portions 3 (3a and 3b) configured to connect the first assembly 1 to the second assembly 2 using a hinge structure, at least one pair of driving wheels 341 and 342, and driving units 333 and 334 configured to rotate the driving wheels 341 and 342.

The payload includes all items vertically moved by the lift-driving portion 200. The loading plate 110 may have a circular plate shape.

Also, the payload transportation device may include a rotation-driving portion 130 configured to rotate the loading plate 110. The rotation-driving portion 130 is provided below the loading plate 110, moves upward or downward with the loading plate 110 due to driving of the lift-driving portion 200, and rotates the loading plate 110.

To rotate the loading plate 110, the rotation-driving portion 130 includes a rotation-driving motor (not shown) coupled to a bottom of the upper support plate 120 to provide a rotation-driving force, a rotation-driven gear 133 rotated by a rotational force of the rotation-driving motor, and a rotation-driving ring gear 131 engaged with the rotation-driven gear 133 to rotate with the rotation-driven gear 133.

Gear teeth on outer circumferential surfaces of the rotation-driven gear 133 and the rotation-driving ring gear 131 are engaged with each other and rotate together. A bearing 132 is coupled to an inner surface of the rotation-driving ring gear 131.

The rotation-driving portion 130 is provided on the upper support plate 120 and moves upward or downward as the upper support plate 120 moves upward or downward.

The loading plate 110, the upper support plate 120, and the rotation-driving portion 130 will be defined as "an upper structure."

The first assembly 1 includes a pair of lift-supporting portions 410 and 420 to support a bottom of one side of the loading plate 110. The second assembly 2 includes a pair of lift-supporting portions 430 and 440 to support a bottom of the other side of the loading plate 110.

The pair of driving wheels 341 and 342 are coupled to both sides of a bottom of the first assembly 1. In this case, when lengths and structures of the first assembly 1 and the second assembly 2 are changed, the driving wheels 341 and 342 may be modified to be coupled to the second assembly 2.

The lift-driving portion 200 may include a lifting motor 210, a plurality of decelerators 221, 222, and 223, and a plurality of rotational shafts 226-1, 226-2, 226-3, 231-1, 231-2, 251-1, and 251-2. In this case, some components included in the lift-driving portion 200, such as the lifting motor 210, the plurality of decelerators 221, 222, and 223, and the plurality of rotational shafts 226-1, 226-2, 226-3, 231-1, 231-2, 251-1, and 251-2, are provided in the first assembly 1, and other components included in the lift-driving portion 200 are provided in the second assembly 2.

The pair of lift-supporting portions 410 and 420 are vertically lifted by some components of the of the lift-driving portion 200 provided in the first assembly 1, and the pair of lift-supporting portions 430 and 440 are vertically lifted by the other components of the lift-driving portions 200 provided in the second assembly 2. In this case, the lift-supporting portions 410 and 420 provided in the first assembly 1 and the lift-supporting portions 430 and 440 provided in the second assembly 2 are vertically lifted in the same phase.

There are provided first assembly housings 311, 312, 313, 314, 315, and 316 configured to install or support the some components of the lift-driving portion 200, the driving wheels 341 and 342, and a driven wheel 343, which are provided in the first assembly 1.

The first assembly housings 311, 312, 313, 314, 315, and 316 include a first bottom plate 311 configured to form a bottom, a first driven wheel-supporting plate 312 coupled to a front end of the first bottom plate 311 and below which the driven wheel 343 (refer to FIG. 6) is installed, a plurality of lateral plates 313, 314, 315, and 316 provided to be upright along a perimeter of the first bottom plate 311.

Some components included in the lift-driving portion 200 are installed above the first bottom plate 311.

There are provided second assembly housings 321, 322, 323, and 324 configured to install or support the other components of the lift-driving portion 200 and a driven wheel 344 (refer to FIG. 6), which are provided in the second assembly 2.

The second assembly housings 321, 322, 323, and 324 include a second bottom plate 321 configured to form a bottom, a second driven wheel-supporting plate 322 coupled to a rear end of the bottom plate 321 and below which the driven wheel 344 is installed, and a pair of lateral housings 323 and 324 provided on both sides of the second bottom plate 321.

The other components included in the lift-driving portion 200 are installed above the second bottom plate 321.

The hinge portions 3: 3a and 3b connect adjacent ends of the first assembly 1 and the second assembly 2 in a hinge structure so as to allow the first assembly 1 and the second assembly 2 to be relatively rotatable about a pair of hinge shafts 350a and 350b having lateral lengths perpendicular to a running direction of the first assembly 1 and the second assembly 2. In the embodiment, the pair of hinge shafts 350a and 350b are included. However, one connected hinge shaft may be included.

The pair of hinge shafts 350a and 350b are coupled to the second assembly 2, and hinge shaft insertion holes 313a and 315a, into which the hinge shafts 350a and 350b are inserted, are formed in the pair of lateral plates 313 and 315 provided on left and right sides of the first assembly 1.

As described above, the first assembly 1 and the second assembly 2 are connected by the hinge portions 3a and 3b so that the first assembly 1 and the second assembly 2 are relatively rotatable about the hinge portions 3a and 3b. Accordingly, when the payload transportation device runs, since driving wheels come into contact with a ground surface at all times even when the ground surface is uneven, driving forces of driving motors 333 and 334 may be transmitted to the driving wheels 341 and 342.

In the first assembly 1, as components for linear running, a first driving motor (not shown) and a second driving motor (not shown) provided on one side and the other side to provide driving forces for linear running, a decelerator 333 configured to reduce rotation speed of the first driving motor, a decelerator 334 configured to reduce rotation speed of the second driving motor, the driving wheel 341 connected to the decelerator 333 on one side and rotated by driving of the first driving motor, and the driving wheel 342 connected to the decelerator 334 on the other side and rotated by driving of the second driving motor.

The driven wheel 343 is coupled to a bottom of the first driven wheel-supporting plate 312, and the driven wheel 344 is coupled to a bottom of the second driven wheel-supporting plate 322.

In the first assembly 1, a deceleration portion 220 and a first power transmission portion 230, which are part of the lift-driving portion 200, are provided. In the second assembly 2, a second power transmission portion 250 which is the other component of the lift-driving portion 200 is provided. The first assembly housings 311, 312, 313, 314, 315, and 316 configured to support components of the first assembly 1 and the second assembly housings 321, 322, 323, and 324 configured to support components of the second assembly 2 are connected by the hinge portions 3: 3a and 3b. Accordingly, the driving wheels 341 and 342 may come into constant contact with a ground surface and a payload may be stably lifted using one lift-driving unit 210. Also, since the hinge portions 3: 3a and 3b and the lift-driving portion 200 are not installed in a stacked structure with different heights but are all installed at a height at which the first assembly housings 311, 312, 313, 314, 315, and 316 and the second assembly housings 321, 322, 323, and 324 are located, it is possible to implement the payload transportation device having a low height.

Components of the lift-driving portion 200 according to the present invention will be described with reference to FIGS. 4 to 12.

The lift-driving portion 200 includes the lift-driving unit 210 configured to generate a driving force to vertically lift the loading plate 110, the first power transmission portion 230 configured to apply a vertical lifting force to one side of a bottom of the loading plate 110 due to the driving force of the lift-driving unit 210, and the second power transmission portion 250 configured to apply a vertical lifting force to the other side of the bottom of the loading plate 110 due to the driving force of the lift-driving unit 210.

The lift-driving unit 210 may include the lifting motor 210 configured to provide the driving force of lifting the loading plate 110.

The deceleration portion 220 configured to reduce rotation speed may be provided between the lift-driving unit 210 and the first power transmission portion 230 and between the lift-driving unit 210 and the second power transmission portion 250.

Due to the above configuration, the driving force generated by one lifting motor 210 is transmitted to the first power transmission portion 230 through the deceleration portion 220 as well as being transmitted to the second power transmission portion 250 through the deceleration portion 220.

In a plan view, the deceleration portion 220, the first power transmission portion 230, and the second power transmission portion 250 form a shape of the letter H so that four edges of the loading plate 110 may be lifted by the driving force of the lift-driving unit 210.

The deceleration portion 220 includes a first decelerator 221 connected to a motor shaft of the lifting motor 210, first rotational shafts 226-1, 226-2, and 226-3 meeting the motor shaft of the lifting motor 210 at a right angle on a level and passing through the first decelerator 221, a second decelerator 222 connected to one end of the first rotational shafts 226-1, 226-2, and 226-3, and a third decelerator 223 connected to the other end of the first rotational shafts 226-1, 226-2, and 226-3.

The first rotational shafts 226-1, 226-2, and 226-3 include first to third sub-rotational shafts 226-1, 226-2, and 226-3 configured to transmit rotational power received from the first decelerator 221 to the second decelerator 222 and the third decelerator 223.

The first sub-rotational shaft 226-1 and the second sub-rotational shaft 226-2 are connected by a first coupler 227, and the second sub-rotational shaft 226-2 and the third sub-rotational shaft 226-3 are connected by a second coupler 228.

The second decelerator 222 is connected to one end of the first sub-rotational shaft 226-1 and transmits rotation of the first sub-rotational shaft 226-1 to second rotational shafts 231-1 and 231-2 of the first power transmission portion 230 which meet the first sub-rotational shaft 226-1 at a right angle.

The third decelerator 223 is connected to the other end of the first to third sub-rotational shafts 226-1, 226-2, and 226-3 and transmits rotation of the first to third sub-rotational shafts 226-1, 226-2, and 226-3 to third rotational shafts 251-1 and 251-2 provided to be parallel to the second rotational shafts 23-1 and 231-2 at positions meeting the first to third sub-rotational shafts 226-1, 226-2, and 226-3 at a right angle while facing the second rotational shafts 231-1 and 231-2.

The first decelerator 221, the second decelerator 222, and the third decelerator 223 are connected in a worm-gear manner and transmit rotation between two intersecting shafts.

The first power transmission portion 230 may include the second rotational shafts 231-1 and 231-2, cam members 232 and 233, and lifting members 235 and 236.

One end of the second rotational shafts 231-1 and 231-2 is connected to the second decelerator 222, and the second rotational shafts 231-1 and 231-2 are rotatably supported by a plurality of components along a longitudinal direction.

The second rotational shafts 231-1 and 231-2 include a fourth sub-rotational shaft 231-1 connected to the second decelerator 222 to be perpendicular to the first sub-rotational shaft 226-1 and a fifth sub-rotational shaft 231-2 having another end to which the fourth sub-rotational shaft 231-1 is connected.

The fifth sub-rotational shaft 231-2 passes through a support block 245, and a bearing is disposed in a through part and rotatably supports the fifth sub-rotational shaft 231-2.

The fourth sub-rotational shaft 231-1 passes through a support block 246, and a bearing is disposed in a through part and rotatably supports the fourth sub-rotational shaft 231-1.

The fourth sub-rotational shaft 231-1 and the fifth sub-rotational shaft 231-2 are connected by a third coupler 234.

The cam members 232 and 233 include the cam member 232 connected to an end of the fifth sub-rotational shaft 231-2 and the cam member 233 connected to an end of the fourth sub-rotational shaft 231-3. The cam member 232 on one side is held by the lifting member 235 to be integrally movable upward or downward, and the cam member 233 on the other side is held by the lifting member 236 to be integrally movable upward or downward.

The cam member 232 on one side is integrally coupled to a guide block 237, and the guide block 237 is coupled, so as to be vertically movable, to a guide rail 241 having a vertical length.

The lifting member 235 is vertically lifted with the guide block 237, and the guide rail 241 guides vertical movement of the guide block 237 when the guide block 237 is lifted.

The guide rail 241 is coupled to the lateral plate 315.

The cam member 233 on the other side is integrally coupled to a guide block 238, and the guide block 238 is coupled, to be vertically movable, to a guide rail 242 having a vertical length.

The lifting member 236 is vertically lifted with the guide block 238, and the guide rail 242 guides vertical movement of the guide block 238 when the guide block 238 is lifted.

The guide rail 242 is coupled to the lateral plate 313.

The guide block 238 and the guide rail 242 on the other side are provided to be symmetrical to the guide block 237 and the guide rail 241 on the one side.

The second power transmission portion 250 may include the third rotational shafts 251-1 and 251-2, cam members 252 and 253, and lifting members 255 and 256, be provided at a position facing the first power transmission portion 230 to be parallel thereto, and include the same configuration as that of the first power transmission portion 230.

The third rotational shafts 251-1 and 251-2 include a sixth sub-rotational shaft 251-1 and a seventh sub-rotational shaft 251-2 and are provided at positions to face the second rotational shafts 231-1 and 231-2 to be parallel while including the same configuration.

The seventh sub-rotational shaft 251-2 passes through a support block 265, and a bearing is disposed in a through part and rotatably supports the seventh sub-rotational shaft 251-2.

The sixth sub-rotational shaft 251-1 passes through a support block 266, and a bearing is disposed in a through part and rotatably supports the sixth sub-rotational shaft 251-1.

The sixth sub-rotational shaft 251-1 and the seventh sub-rotational shaft 251-2 are connected by a fourth coupler 254.

The cam member 252 and the lifting member 255 on the one side have the same configurations as those of the cam member 232 and the lifting member 235 of the first power transmission portion 230.

The cam member 253 and the lifting member 256 on the other side have the same configurations as those of the cam member 233 and the lifting member 236 of the first power transmission portion 230 and are provided to be symmetrical to the cam member 252 and the lifting member 255 on the one side.

There are provided a guide block 257 integrally coupled to the lifting member 255 on the one side and a guide rail 261 configured to guide vertical movement of the guide block 257. The guide block 257 and the guide rail 261 have the same configurations as those of the guide block 237 and the guide rail 241 of the first power transmission portion 230.

There are provided a guide block 258 integrally coupled to the lifting member 256 on the other side and a guide rail 262 configured to guide vertical movement of the guide block 258. The guide block 258 and the guide rail 262 have the same configurations as those of the guide block 238 and the guide rail 242 of the first power transmission portion 230.

Figure 11:
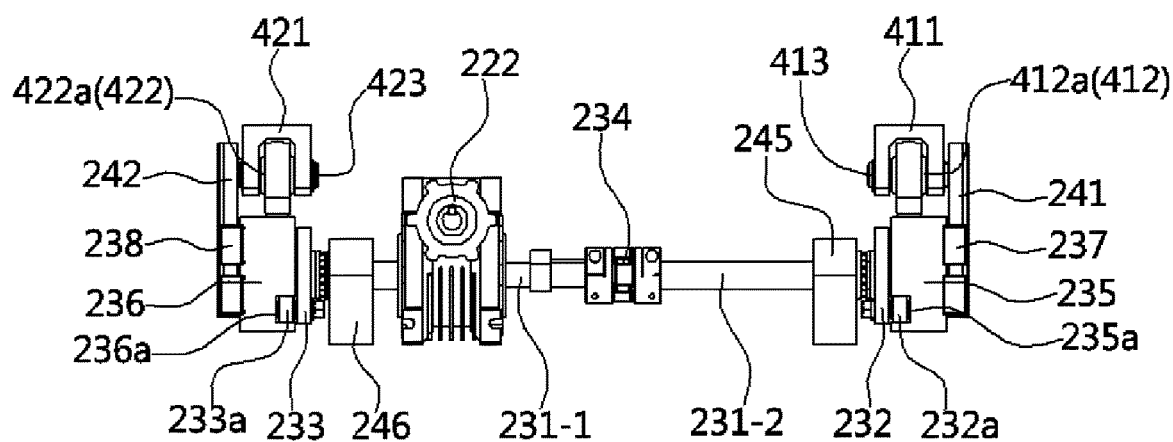
FIG. 11 is a side view illustrating a first power transmission portion according to the present invention.
Figure 12:
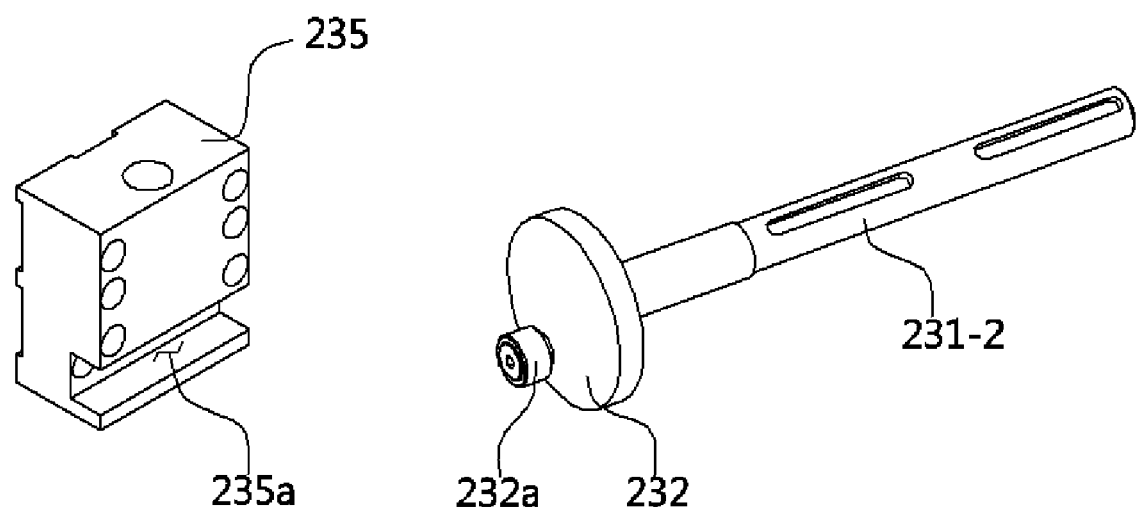
FIG. 12 is a perspective view illustrating a lifting member and a cam member according to the present invention.

The cam member 232 and the lifting member 235 will be described with reference to FIGS. 11 and 12.

The cam member 232 has a circular plate shape and is coupled to an end of the fifth sub-rotational shaft 231-2 to integrally rotate with the fifth sub-rotational shaft 231-2. The fifth sub-rotational shaft 231-2 is coupled to one among side surfaces of the cam member 232, and a cam protruding portion 232a protruding toward an axial direction of the fifth sub-rotational shaft 231-2 is formed on the other opposite thereto.

The cam protruding portion 232a is formed at a position externally eccentric from a center of the cam member 232 having the circular plate shape.

The lifting member 235 has a rectangular parallelepiped shape and has a side surface facing the cam protruding portion 232a, in which a guide groove 235a is formed to be concave with a length in a horizontal direction, so as to linearly move in a vertical direction due to rotation of the cam member 232.

The cam protruding portion 232a is inserted into the guide groove 235a. When the cam protruding portion 232a is present at an upper died point or a lower died point of the cam member 232, the cam protruding portion 232a may be located in the middle in the guide groove 235a.

While the cam protruding portion 232a is present at the lower died point, when the cam member 232 rotates, for example, by 90 degrees clockwise, the cam protruding portion 232a moves from a position in the middle of the guide groove 235a to a position on one edge thereof such that the lifting member 235 receives a force and is lifted while being held by the cam protruding portion 232a.

Subsequently, when the cam member 232 further rotates by 90 degrees clockwise, the cam protruding portion 232a is located at the upper died point so that the cam protruding portion 232a moves from the position on the one edge of the guide groove 235a to the position in the middle and the lifting member 235 is further lifted.

Subsequently, when the cam member 232 further rotates by 90 degrees clockwise, the cam protruding portion 232a moves from the position in the middle of the guide groove 235a to the position on the one edge and the lifting member 235 receives a force due to a dead load and moves downward while being held by the cam protruding portion 232a.

Subsequently, when the cam member 232 further rotates by 90 degrees clockwise, the cam protruding portion 232a is located at the lower died point so that the cam protruding portion 232a moves from the position on the other edge of the guide groove 235a to the position in the middle and the lifting member 235 further moves downward.

Accordingly, even when the cam member 232 rotates by 360 degrees, the cam protruding portion 232a moves horizontally in the guide groove 235a and the lifting member 235 is movable upward or downward.

The cam member 233 and the lifting member 236 on the other side are provided to have the same configurations as those of the cam member 232 and the lifting member 235 on the one side and to be symmetrical thereto.

The cam protruding portion 232a on the one side and the cam protruding portion 233a on the other side protrude in opposite directions of becoming farther away from each other, and the guide groove 235a of the lifting member 235 on the one side and a guide groove (not shown) of the lifting member 236 on the other side are formed to face each other.

In this case, the cam protruding portion 232a of the cam member 232 on the one side and the cam protruding portion of the cam member 233 on the other side are formed at the same angle to be symmetrical with respect to the second rotational shafts 231-1 and 231-2.

That is, when viewed from an axial direction of the second rotational shafts 231-1 and 231-2, a phase of the cam member 232 on the one side is equal to a phase of the cam member 233 on the other side. Accordingly, when the second rotational shafts 231-1 and 231-2 rotate, the cam member 232 on the one side and the cam member 233 on the other side rotate together in the same phase and apply lifting forces to a bottom of one side of the loading plate 110 at the same time.

As described above, a pair of such cam members 232 and 233 and a pair of such lifting members 235 and 236 are provided on one side and the other side of the first assembly 1, respectively, and configured to apply vertical lifting forces to bottoms of both sides of one edge of the loading plate 110.

Meanwhile, since a pair of such cam members 252 and 253 and a pair of such lifting members 255 and 256 which are provided in the second assembly 2 also have the same configurations as those of the pair of cam members 232 and 233 and the pair of lifting members 235 and 236 which are provided in the first assembly 1, a detailed description thereof will be omitted.

The lift-supporting portions 410 and 420 provided in the first assembly 1 and the lift-supporting portions 430 and 440 provided in the second assembly 2 will be described with reference to FIGS. 6, 7, 8, 10, and 11.

The pair of lift-supporting portions 410 and 420 provided in the first assembly 1 include a first lift-supporting portion 410 coupled to a top of the lifting member 235 vertically lifting due to rotation of the cam member 232 connected to the fifth sub-rotational shaft 231-2 and a second lift-supporting portion 420 coupled to a top of the lifting member 236 vertically lifting due to rotation of the cam member 233 connected to the fourth sub-rotational shaft 231-1.

The pair of lift-supporting portions 430 and 440 provided in the second assembly 2 include a third lift-supporting portion 430 coupled to a top of the lifting member 255 vertically lifting due to rotation of the cam member 252 connected to the seventh sub-rotational shaft 251-2 and a fourth lift-supporting portion 440 coupled to a top of the lifting member 256 vertically lifting due to rotation of the cam member 253 connected to the sixth sub-rotational shaft 251-1.

The first to fourth lift-supporting portions 410, 420, 430, and 440 are coupled to a bottom surface of an edge of the upper support plate 120 and support the loading plate 110 and the rotation-driving portion 130 thereabove.

The first to fourth lift-supporting portions 410, 420, 430, and 440 include a ball-joint structure to allow relative rotation generated by distortion or the like with the upper structure.

In this case, there is provided a structure in which only the relative rotation is allowed between the first lift-supporting portion 410 and the second lift-supporting portion 420 by the ball-joint structure and the relative rotation using the ball-joint structure and sliding movement parallel to an axial direction of the first rotational shafts 226-1, 226-2, and 226-3 are allowed between the third lift-supporting portion 430 and the fourth lift-supporting portion 440.

The first to fourth lift-supporting portions 410, 420, 430, and 440 have basic components in common. That is, each of the first to fourth lift-supporting portions 410, 420, 430, and 440 includes a lifting support 411, 421, 431, or 441 coupled to the bottom surface of the supper support plate 120 and having an upside-down U-shaped vertical cross section, a ball joint 412, 422, 432, or 442 including a ball portion in the lifting support 411, 421, 431, or 441, and a connection shaft 413, 423, 433, or 443 having both ends coupled to the lifting support 411, 421, 431, or 441 and having a central part where relative rotation with the ball portion of the ball joint, 412, 422, 432, or 442 is performed.

Figure 8:
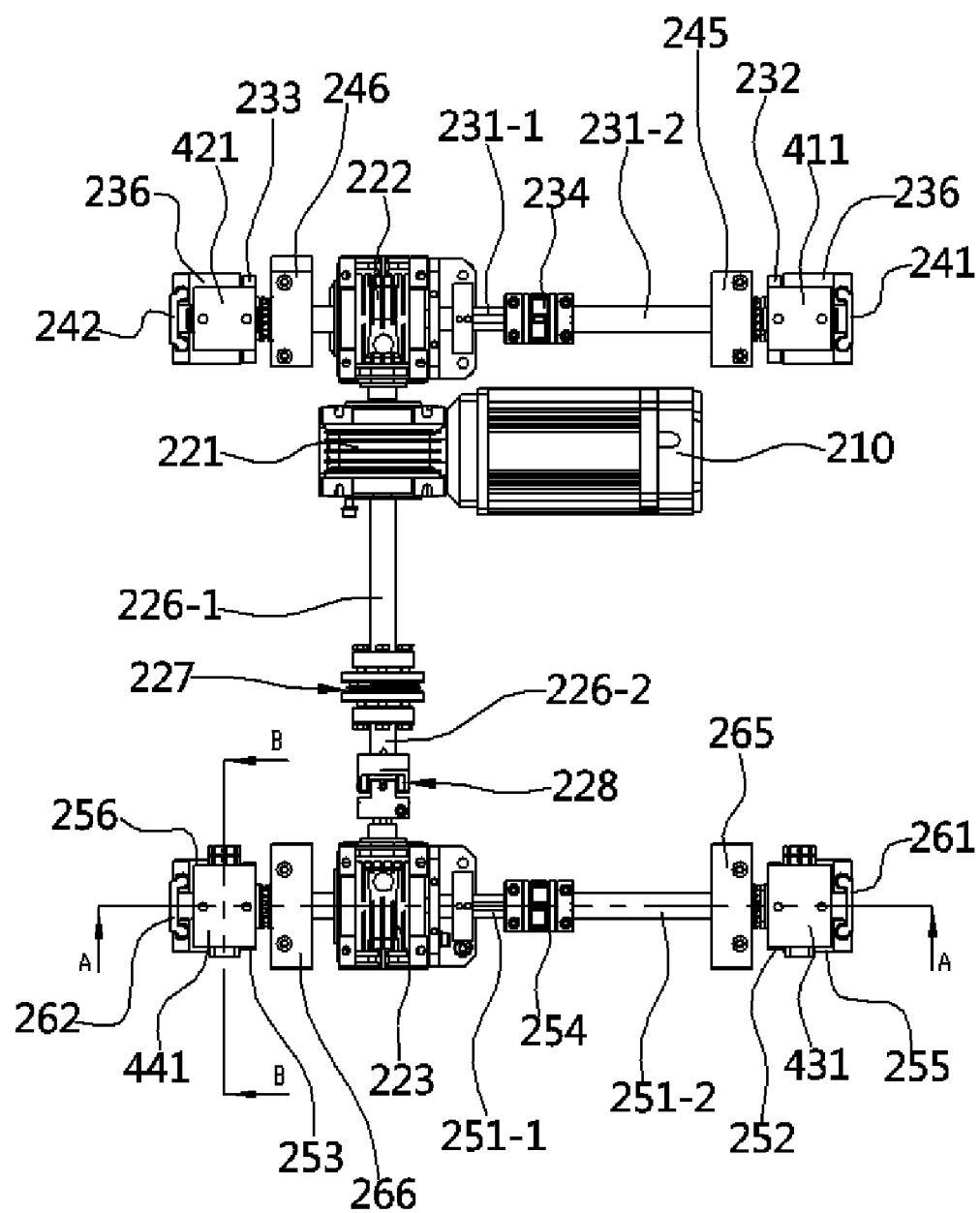
FIG. 8 is a plan view illustrating the lift-driving portion according to the present invention.
Figure 9:
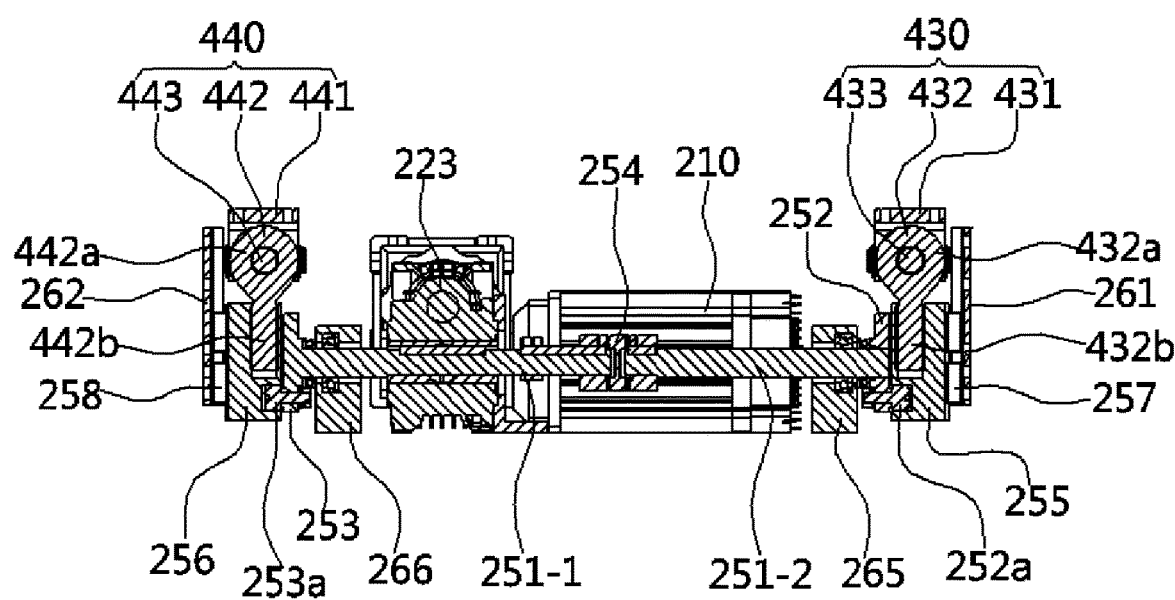
FIG. 9 is a cross-sectional view taken along line A-A in FIG. 8.
Figure 10:
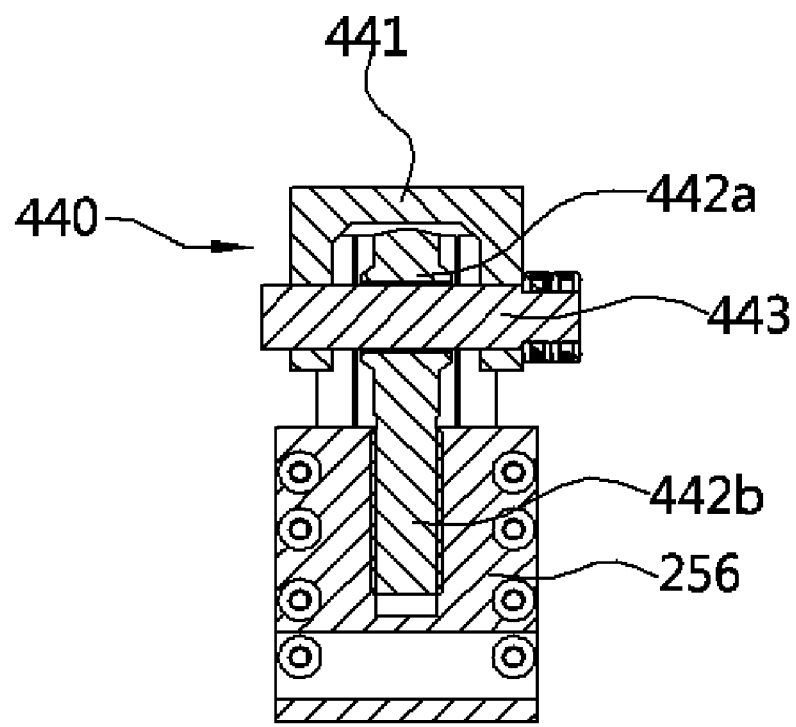
FIG. 10 is a cross-sectional view taken along line B-B in FIG. 8.

Referring to FIGS. 8 and 10, the ball joint 432 or 442 provided in the third and fourth lift-supporting portion 430 or 440 includes a ball portion 432a or 442a in a ball shape and a shaft portion 432b or 442b extending downward from the ball portion 432a or 442a. The shaft portions 432b and 442b are coupled to the lifting members 255 and 256, respectively. Since the connection shafts 433 and 443 have lengths parallel to the first rotational shafts 226-1 and 226-2 and are applied to pass through the ball portions 432a and 442a, respectively, the lifting supports 431 and 441 coupled to the connection shafts 433 and 443 are relatively rotatable with the ball portions 432a and 442a, respectively.

In this case, as shown in FIG. 10, sizes of the lifting support 441, the connection shaft 443, and the ball portion 442a may be determined to allow the connection shaft 443 of the fourth lift-supporting portion 440 to be relatively movable (linearly slidable) with the ball portion 442a along a longitudinal direction of the connection shaft 443. Although not shown in the drawing, the third lift-supporting portion 440 also has the same components as those of the fourth lift-supporting portion 440. Accordingly, sizes of the lifting support 431, the connection shaft 433, and the ball portion 432a may be determined to allow the connection shaft 433 to be relatively movable with the ball portion of the ball joint 432 along a longitudinal direction of the connection shaft 433.

Meanwhile, the first lift-supporting portion 410 is configured to perform only relative rotation between the connection shaft 413 and a ball portion 412a of the ball joint 412 and not to perform relative movement along a longitudinal direction of the connection shaft 413. Also, the second lift-supporting portion 420 may be configured to perform only relative rotation between the connection shaft 423 and the ball portion of the ball joint 422 and not to perform relative movement along a longitudinal direction of the connection shaft 423. In this case, the connection shaft of the first lift-supporting portion 410 and the connection shaft 423 of the second lift-supporting portion 420 are provided to have lengths in directions parallel to the second rotational shafts 231-1 and 231-2, respectively.

Figure 13:
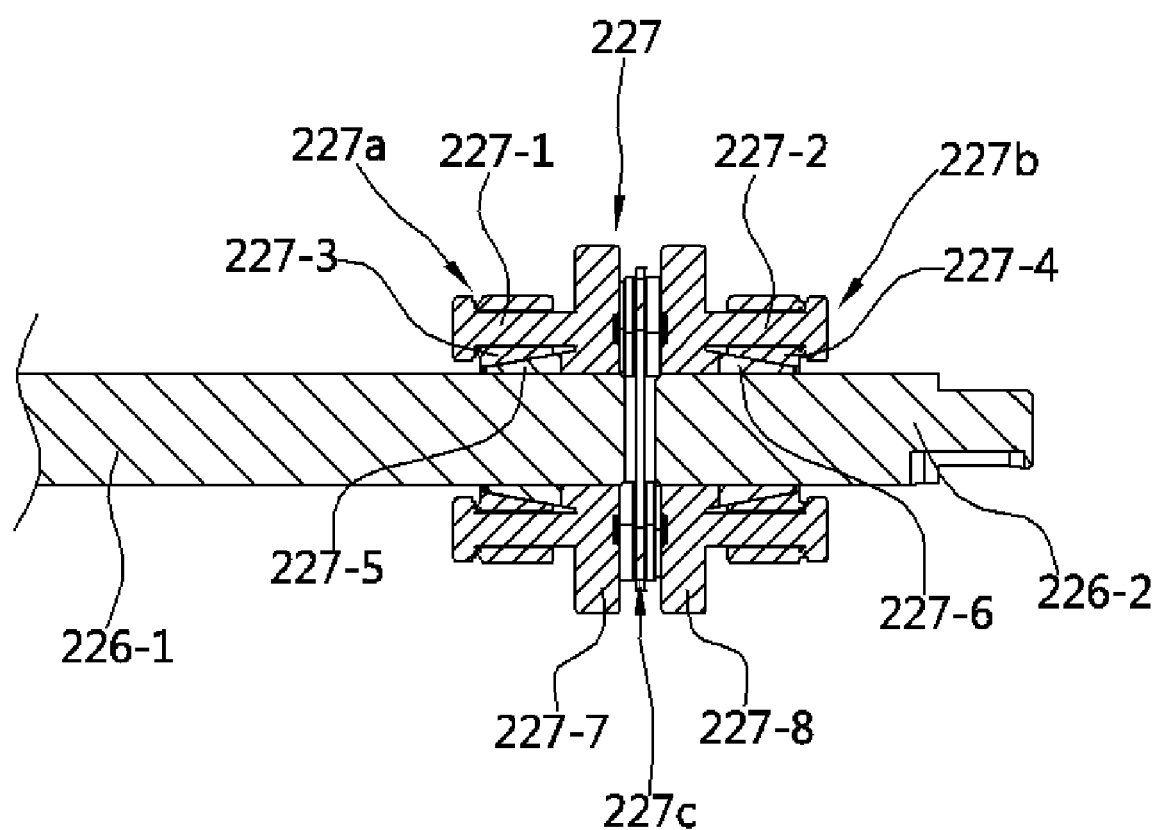
FIG. 13 is a cross-sectional view illustrating a state in which a first coupler is connected to a rotational shaft according to the present invention.

The first coupler 227 will be described with reference to FIG. 13.

The first coupler 227 connects the first sub-rotational shaft 226-1 to the second sub-rotational shaft 226-2.

Phases of the cam protruding portions of the plurality of cam members 232, 233, 252, and 253 should all coincide with one another. Since it is difficult to precisely process the second decelerator 222 and the third decelerator 223 and a plurality of components are connected, the phases of the cam protruding portions of the cam members 232, 233, 252, and 253 may not coincide with one another.

The first coupler 227 is configured to couple the first sub-rotational shaft 226-1 to the second sub-rotational shaft 226-2 while the phases of the cam protruding portions of the cam members 232, 233, 252, and 253 coincide with one another.

The first coupler 227 includes a first sub-coupler 227a coupled to the first sub-rotational shaft 226-1 and a second sub-coupler 227b coupled to the second sub-rotational shaft 226-2.

The first sub-coupler 227a includes an internal pressurizing member 227-5, which comes into contact with an outer surface of the first sub-rotational shaft 226-1 and has a wedge-shaped outer surface and a center through which the first sub-rotational shaft 226-1 passes, an external pressurizing member 227-3 having a wedge-shaped inner surface so as to correspondingly come into contact with the wedge-shaped outer surface of the internal pressurizing member 227-5, a coupler housing 227-7 having a circular plate shape and a center through which an end of the first sub-rotational shaft 226-1 passes, and a fastening member 227-1 passing through the external pressurizing member 227-3 so that an end is screw-coupled to the coupler housing 227-7.

A plurality of such fastening members 227-1 each include a head part coming into contact with one side surface of the external pressurizing member 227-3 and having a length in a direction parallel to the first sub-rotational shaft 226-1 and are provided along a circumference of the first sub-rotational shaft 226-1.

The internal pressurizing member 227-5 may be integrally formed with the coupler housing 227-7.

The second sub-coupler 227b includes an internal pressurizing member 227-6, which comes into contact with an outer surface of the second sub-rotational shaft 226-2 and has a wedge-shaped outer surface and a center through which the second sub-rotational shaft 226-2 passes, an external pressurizing member 227-4 having a wedge-shaped inner surface so as to correspondingly come into contact with the wedge-shaped outer surface of the internal pressurizing member 227-6, a coupler housing 227-8 having a circular plate shape and a center through which an end of the second sub-rotational shaft 226-2 passes, and a fastening member 227-2 passing through the external pressurizing member 227-4 so that an end is screw-coupled to the coupler housing 227-8.

A plurality of such fastening members 227-2 each include a head part coming into contact with one side surface of the external pressurizing member 227-4 and having a length in a direction parallel to the second sub-rotational shaft 226-2 and are provided along a circumference of the second sub-rotational shaft 226-2.

The internal pressurizing member 227-6 may be integrally formed with the coupler housing 227-8.

The first sub-coupler 227a and the second sub-coupler 227b are provided to be symmetrical to each other with a coupler connection portion 227c disposed therebetween. The first sub-coupler 227a and the second sub-coupler 227b are integrally coupled by the coupler connection portion 227c.

To connect the first sub-rotational shaft 226-1 and the second sub-rotational shaft 226-2 using the first coupler 227, first, all the second rotational shafts 231-1 and 231-2 and the cam members 232 and 233 in addition to the first decelerator 221 and the second decelerator 222 are connected to the first sub-rotational shaft 226-1. All of the second coupler 228, the third decelerator 223, the third rotational shafts 251-1 and 251-2 and the cam members 252 and 253 are connected to the second sub-rotational shaft 226-2. The first coupler 227 is connected between the first sub-rotational shaft 226-1 and the second sub-rotational shaft 226-2 while the fastening member 227-1 and the fastening member 227-2 of the first coupler 227 are temporarily fastened. When the fastening members 227-1 and 227-2 are completely fastened while the phases of the cam protruding portions of the four cam members 232, 233, 252, and 253 all coincide with one another, the external pressurizing members 227-3 and 227-4 on both sides move to face the first sub-rotational shaft 226-1 and the second sub-rotational shaft 226-2. As the wedge-shaped inner surfaces of the external pressurizing members 227-3 and 227-4 ascend along wedge-shaped outer slant surfaces of the internal pressurizing members 227-5 and 227-6, the internal pressurizing members 227-5 and 227-6 are pressurized in radial directions of the first sub-rotational shaft 226-1 and the second sub-rotational shaft 226-2 and firmly fastened to the first sub-rotational shaft 226-1 and the second sub-rotational shaft 226-2.

According to the above configurations, it is possible to allow the phases of the cam protruding portions of the plurality of cam members 232, 233, 252, and 253 to precisely coincide with one another so that it is possible to allow a position of the loading plate 110 being lifted by the first assembly 1 and a position of the loading plate 110 being lifted by the second assembly to coincide with each other.

Figure 14:
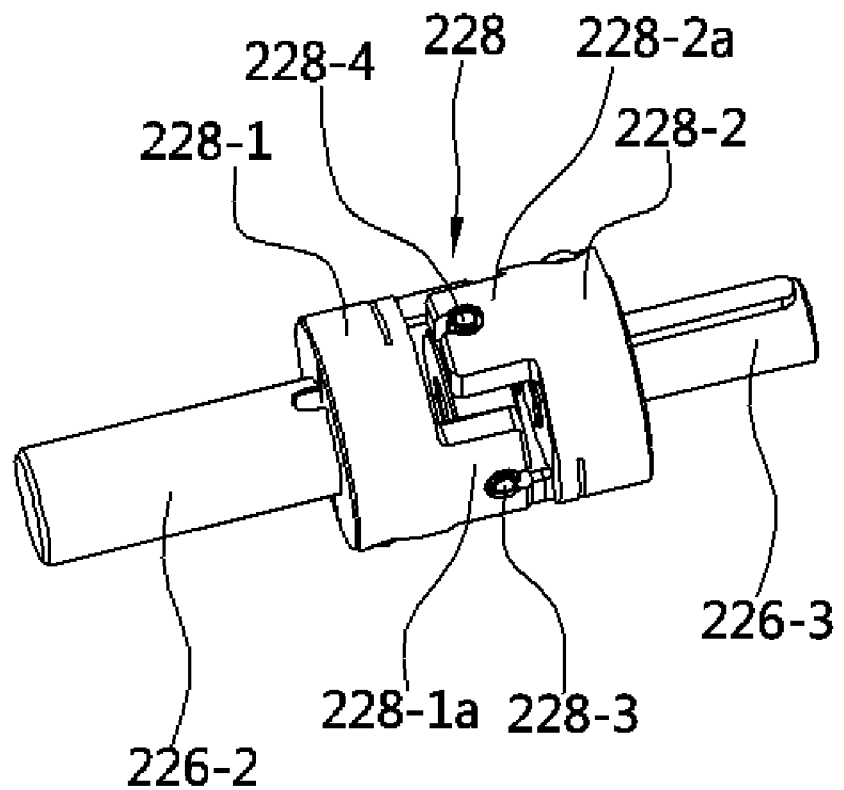
FIG. 14 is a perspective view illustrating a state in which a second coupler is connected to the rotational shaft according to the present invention.

The second coupler 228 will be described with reference to FIG. 14.

The second sub-rotational shaft 226-2 and the third sub-rotational shaft 226-3 are connected by the second coupler 228.

The second coupler 228 includes a pair of coupler members 228-1 and 228-2 coupled to the second sub-rotational shaft 226-2 and the third rotational shaft 226-3, respectively, and a plurality of connection pins 228-3 and 228-4 configured to connect the pair of coupler members 228-1 and 228-2.

A pair of coupler protruding bodies 228-1a are formed at opposite positions of the coupler member 228-1 on one side to protrude toward the coupler member 228-2 on the other side, and a pair of coupler protruding bodies 228-2a are formed at opposite positions of the coupler member 228-2 on the other side to protrude toward the coupler member 228-1 on one side.

The pair of coupler protruding bodies 228-1a on the one side and the pair of coupler protruding bodies 228-2a on the other side are formed alternately along a circumferential perimeter and provided in a shape in which a protruding part is inserted into a groove.

A pair of such connection pins 228-3 on one side are provided to be coupled to the pair of coupler protruding bodies 228-1a, and a pair of such connection pins 228-4 on the other side are provided to be coupled to the pair of coupler protruding bodies 228-2a. The pair of connection pins 228-3 on the one side are provided collinearly at opposite positions, and the pair of connection pins 228-4 on the other side are provided collinearly at opposite positions. Also, the pair of connection pins 228-3 on the one side and the pair of connection pins 228-4 on the other side are provided to meet at a right angle in a plane perpendicular to the second rotational shafts 226-2 and 226-3.

On the basis of the pair of connection pins 228-3, the coupler member 228-1 on the one side and the coupler member 228-2 on the other side may be relatively rotatable or distortable. On the basis of the pair of connection pins 228-4, the coupler member 228-1 on the one side and the coupler member 228-2 on the other side may be relatively rotatable or distortable.

Accordingly, the second coupler 228 may absorb a deviation angle at which the pair of rotational shafts 226-2 and 226-3 deviate from an axial direction between the pair of rotational shafts 226-2 and 226-3 while absorbing the pair of rotational shafts 226-2 and 226-3 being eccentric in a lateral direction perpendicular to the axial direction.

In the case of the present invention, the first assembly 1 and the second assembly 2 are connected by the hinge portions 3 and relative rotation occurs between the first assembly 1 and the second assembly 2 such that eccentricity and a deviation angle may occur at a part where some components of the lift-driving portion 200 provided in the first assembly 1 and the other components of the lift-driving portion 200 provided in the second assembly 2 are connected to each other due to a height difference between ground surfaces. In this case, since the second coupler 228 may absorb the eccentricity and the deviation angle, an impact applied to by the eccentricity and the deviation angle a component to which power is transmitted may be minimized.

Figure 6:
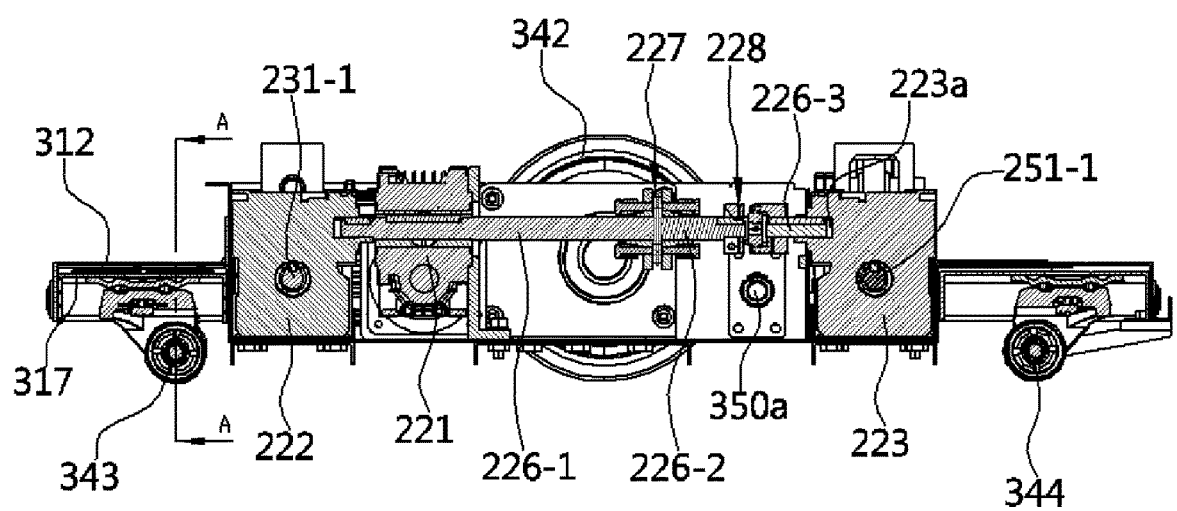
FIG. 6 is a cross-sectional view taken along line A-A in FIG. 4.
Figure 7:
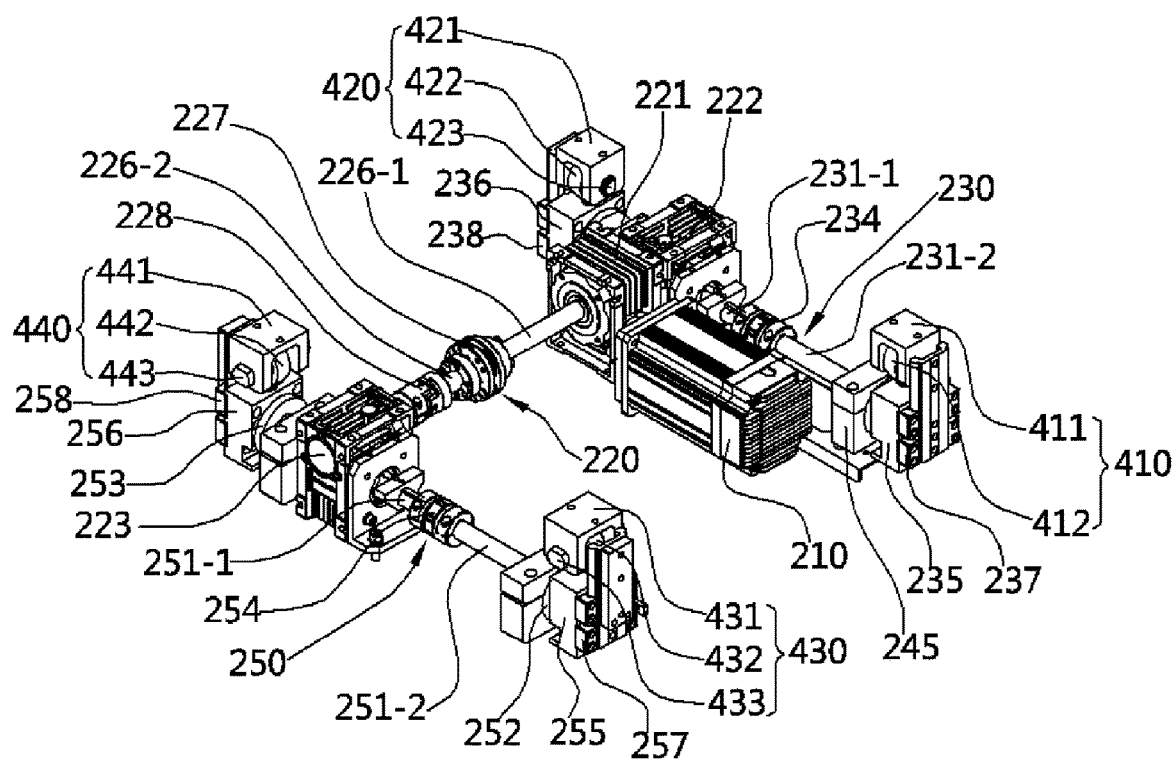
FIG. 7 is a perspective view illustrating a lift-driving portion according to the present invention.

A structure for connection between the third sub-rotational shaft 226-3 and the third decelerator 223 will be described with reference to FIG. 6.

A part of the third sub-rotational shaft 226-3, to which the third decelerator 223 is connected, is a part at which components of the lift-driving portion 200 provided in the first assembly 1 and components of the lift-driving portion 200 provided in the second assembly 2 are connected. At this part, when relative rotation occurs at the hinge portions 3 due to a height difference between ground surfaces, displacement may occur between the third sub-rotational shaft 226-3 and the third decelerator 223.

To absorb the displacement, an end of the third sub-rotational shaft 226-3 is provided to be slidably movable in an axial direction in the third decelerator 223. That is, a slide groove 223a formed to be concave along the axial direction of the third sub-rotational shaft 226-3 is formed in the third decelerator 223, and the third sub-rotational shaft 226-3 is inserted into the slide groove 223a.

When the third sub-rotational shaft 226-3 is inserted into the slide groove 223a, a rotational force of the third sub-rotational shaft 226-3 is transmitted to the third decelerator 223 to be transmitted through the slide groove 223a due to a key-and-key-groove structure. Simultaneously, the third sub-rotational shaft 226-3 is allowed to be slidably movable along a longitudinal direction of the slide groove 223a. Accordingly, it is possible to absorb the displacement occurring between the third sub-rotational shaft 226-3 and the third decelerator 223.

Figure 17:
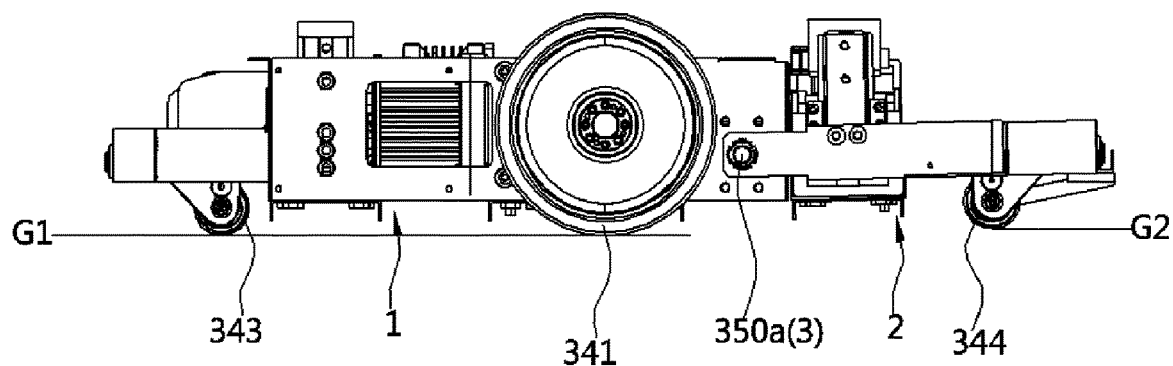
FIG. 17 is a side view illustrating a state in which driven wheels on the front and a rear of the payload transportation device according to the present invention come into contact with each of ground surfaces having different heights.
Figure 18:
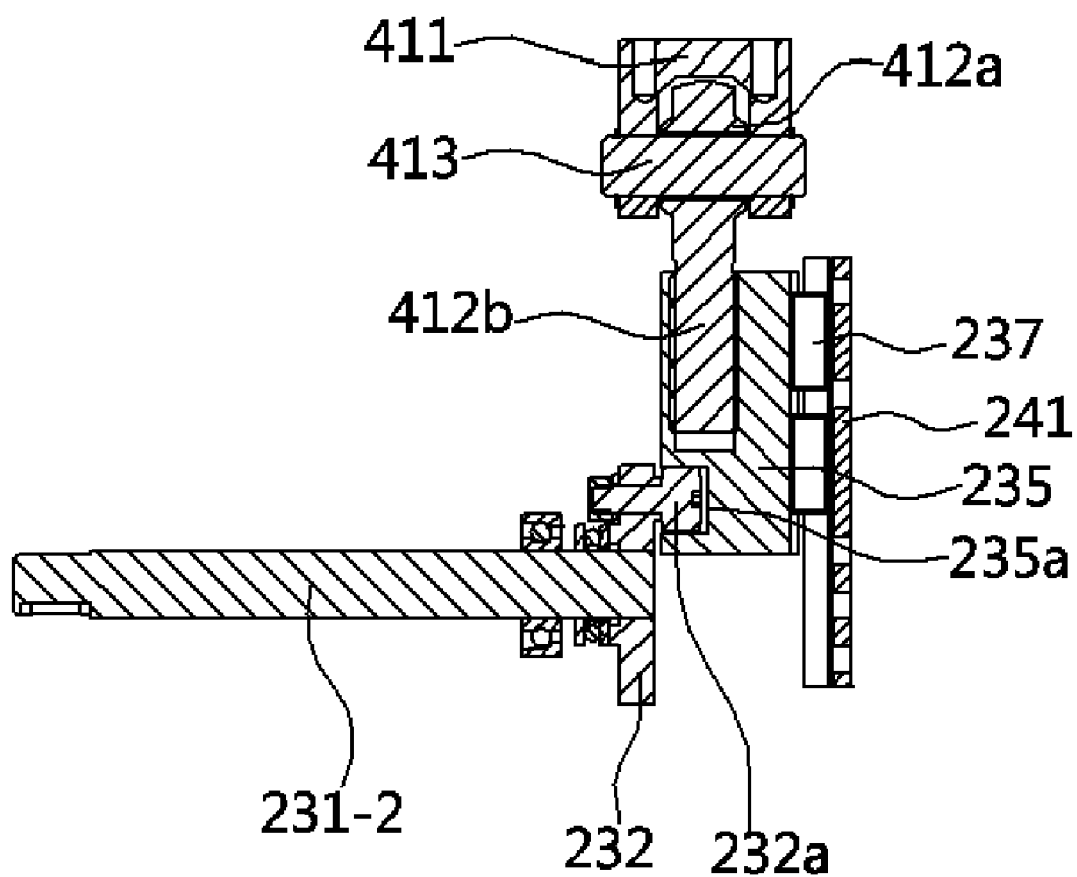
FIG. 18 is a cross-sectional view illustrating a case in which the cam member is a top dead point in the payload transportation device according to the present invention.
Figure 19:
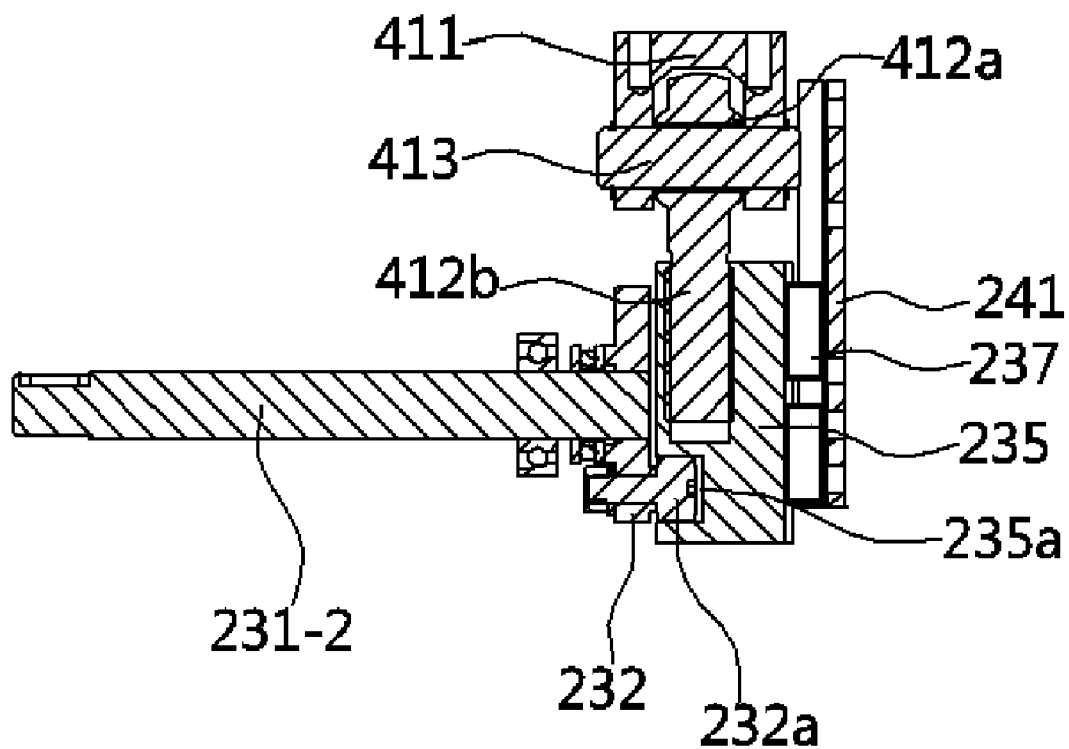
FIG. 19 is a cross-sectional view illustrating a case in which the cam member is a bottom dead point in the payload transportation device according to the present invention.

Referring to FIG. 17, a ground surface G2 with which the rear driven wheel 344 comes into contact is higher than a ground surface G1 with which the front driven wheel 343 and the driving wheel 341 come into contact. Accordingly, the first assembly 1 and the second assembly 2 relatively rotate on the basis of the hinge portions 3. In the above-described state, since all the wheels 341, 342, 343, and 344 come into contact with the ground surface, a driving force may be definitely transmitted.

Figure 15:
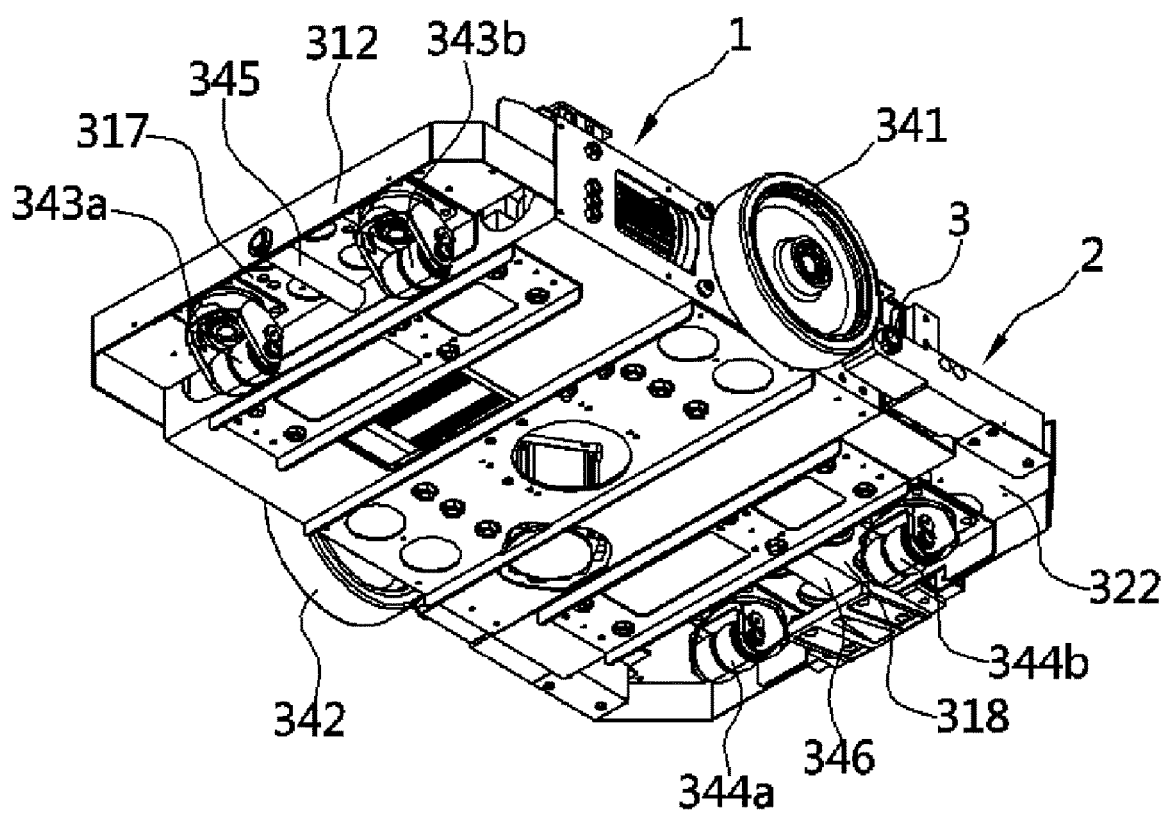
FIG. 15 is a bottom perspective view of the payload transportation device according to the present invention.
Figure 16:
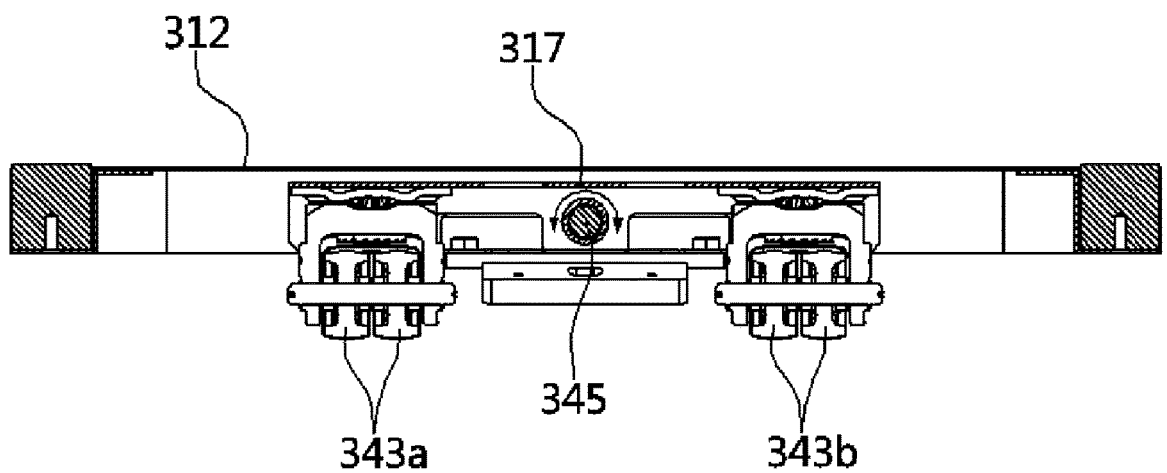
FIG. 16 is a cross-sectional view taken along line A-A in FIG. 6 and illustrating an installation structure of driven wheels provided on a front of the payload transportation device.

Referring to FIGS. 15 and 16, a pair of first driven wheels 343a and 343b spaced laterally apart are provided below the first driven wheel-supporting plate 312 in front, and a pair of second driven wheels 344a and 344b spaced laterally apart are provided below the second driven wheel-supporting plate 322 in the rear.

A rod-shaped driven wheel central shaft 345 having a length in a front-rear direction is coupled to the first driven wheel-supporting plate 312.

A driven wheel-supporting plate 317 at least partially having a plate shape is coupled to the driven wheel central shaft 345 to be laterally pivotable about the driven wheel central shaft 345 as a rotational center. In this case, the driven wheel central shaft 345 has a length extending in a direction perpendicular to the hinge portions 3.

The pair of first driven wheels 343a and 343b are coupled to a bottom surface of the driven wheel-supporting plate 317 while being spaced laterally apart.

When any one of a ground surface with which the driven wheel 343a of the pair of first driven wheels 343a and 343b on one side comes into contact and a ground surface with which the driven wheel 343b on the other side comes into contact is higher, the driven wheel-supporting plate 317 pivots about the driven wheel central shaft 345 as a rotational center. Accordingly, both of the pair of first driven wheels 343a and 343b come into contact with the ground surface.

A rod-shaped driven wheel central shaft 346 having a length in a front-rear direction is coupled to the first driven wheel-supporting plate 322.

A driven wheel-supporting plate 318 at least partially having a plate shape is coupled to the driven wheel central shaft 346 to be laterally pivotable about the driven wheel central shaft 346 as a rotational center. In this case, the driven wheel central shaft 346 has a length in a direction perpendicular to the hinge portions 3.

The pair of second driven wheels 344a and 344b are coupled to a bottom surface of the driven wheel-supporting plate 318 while being spaced laterally apart.

When any one of a ground surface with which the driven wheel 344a of the pair of second driven wheels 344a and 344b on one side comes into contact and a ground surface with which the driven wheel 344b on the other side comes into contact is higher, the driven wheel-supporting plate 318 pivots about the driven wheel central shaft 346 as a rotational center. Accordingly, both of the pair of second driven wheels 344a and 344b come into contact with the ground surface.

According to the above-described payload transportation device, driving wheels of a transportation device configured to transport a payload may come into contact with the ground surface constantly even when a ground surface is uneven, a payload may be stably lifted using one lift-driving unit, and a height of the payload transportation device may be decreased.

According to the present invention, in a transportation device for transporting a payload, driving wheels may come into contact with the ground surface constantly even when a ground surface is uneven, the payload may be stably lifted using one lift-driving unit, and a height of the payload transportation device may be decreased.

Also, it is possible to allow lifting positions of a first assembly and a second assembly to coincide with each other.

Also, it is possible to absorb eccentricity and a deviation angle, which are generated between a rotational shaft of the first assembly and a rotational shaft of the second assembly, in the first assembly and the second assembly.

Also, it is possible to absorb displacement through slidable movement at a connection portion between a decelerator and a rotational shaft.

Also, it is possible to increase a degree of freedom in design without limitation in a rotational angle of cam members of a lift-driving portion.

Although the exemplary embodiment of the present invention has been described above, the present invention is not limited to the above-described embodiment and may be modified into a variety of forms within the range of the claims, the detailed description, and the attached drawings of the present invention, which are included in the present invention.

What is claimed is:

1. A payload transportation device comprising:
   a loading plate (110) above which a payload is loaded;
   a lift-driving portion (200) configured to generate a driving force to vertically lift the loading plate;
   a first assembly (1) configured to support a bottom of one side of the loading plate and in which some components included in the lift-driving portion (200) are provided;
   a second assembly (2) configured to support a bottom of the other side of the loading plate and in which other components included in the lift-driving portion (200) are provided;
   hinge portions (3a, 3b) configured to connect the first assembly (1) to the second assembly (2) in a hinge structure;
   at least a pair of driving wheels (341, 342) coupled to both sides of a bottom of any one of the first assembly (1) and the second assembly (2); and
   a driving unit configured to rotate the driving wheels (341, 342),
   wherein a first assembly housing configured to support the some components included in the lift-driving portion (200) is provided in the first assembly (1),
   wherein a second assembly housing configured to support the other components included in the lift-driving portion (200) is provided in the second assembly (2), and
   wherein the hinge portions (3a, 3b) hinge-connect the first assembly housing to the second assembly housing to be relatively rotatable.

2. The payload transportation device of claim 1, wherein the lift-driving portion (200) comprises:
   a lift-driving unit (210) configured to generate a driving force to vertically lift the loading plate;
   a first power transmission portion (230) configured to transmit the driving force of the lift-driving unit (210) to apply a vertical lifting force to one side of the bottom of the loading plate; and
   a second power transmission portion (250) configured to transmit the driving force of the lift-driving unit (210) to apply a vertical lifting force to the other side of the bottom of the loading plate.

3. The payload transportation device of claim 2, wherein the first power transmission portion comprises rotational shafts (231-1, 231-2) rotated by the driving force of the lift-driving unit (210), cam members (232, 233) rotated by the rotational shafts (231-1, 231-2), and lifting members (235, 236) configured to linearly move upward or downward due to rotations of the cam members (232, 233), and
   wherein the second power transmission portion comprises rotational shafts (251-1, 251-2) rotated by the driving force of the lift-driving unit (210), cam members (252, 253) rotated by the rotational shafts (251-1, 251-2), and lifting members (255, 256) configured to linearly move upward or downward due to rotations of the cam members (252, 253).

4. The payload transportation device of claim 2, wherein a deceleration portion (220) configured to reduce a rotation speed of the lift-driving unit (210) is provided, and
   wherein the deceleration portion (220), the first power transmission portion (230), and the second power transmission portion (250) are formed in a shape of the letter H so that four edges of the loading plate are lifted by the driving force of the lift-driving unit (210).

5. The payload transportation device of claim 4, wherein the deceleration portion (220) comprises:
   a first decelerator (221) connected to a motor shaft of the lifting motor and configured to transmit rotation of the lifting motor to rotational shafts (226-1, 226-2, 226-3) which meet the motor shaft at a right angle;
   a second decelerator (222) connected to one end of the rotational shafts (226-1, 226-2, 226-3) and configured to transmit rotations of the rotational shafts (226-1, 226-2, 226-3) to rotational shafts (231-1, 231-2) of the first power transmission portion (230), which meet the rotational shafts (226-1, 226-2, 226-3) at a right angle; and
   a third decelerator (223) connected to the other end of the rotational shafts (226-1, 226-2, 226-3) and configured to transmit the rotations of the rotational shafts (226-1, 226-2, 226-3) to rotational shafts (251-1, 251-2) which meet the rotational shafts (226-1, 226-2, 226-3) at a right angle and are provided, to be parallel, at positions facing the rotational shafts (231-1, 231-2).

6. The payload transportation device of claim 2, wherein the lift-driving portion (200) further comprises a deceleration portion (220) having one end, to which the first power transmission portion (230) is connected, and having the other end, to which the second power transmission portion (250) is connected, and configured to reduce a rotational speed of the lift-driving unit (210),
   wherein the deceleration portion (220) and the first power transmission portion (230) are provided in the first assembly (1), and
   wherein the second power transmission portion (250) is provided in the second assembly (2).

7. The payload transportation device of claim 1, wherein the lift-driving portion comprises a lift-driving unit (210) configured to generate a rotational force to vertically lift the loading plate, wherein at least one pair of rotational shafts (226-1, 226-2) configured to transmit a rotational force of the lift-driving unit (210) to the components included in the lift-driving portion (200) provided in the second assembly (2) are provided in the first assembly (1), and wherein a first coupler (227) configured to allow a position of the loading plate being lifted by the first assembly (1) to coincide with a position of the loading plate being lifted by the second assembly (2) and then to couple the pair of rotational shafts (226-1, 226-2) is connected between the pair of rotational shafts.

8. The payload transportation device of claim 7, wherein the first coupler (227) comprises:
a plurality of internal pressurizing members (227-5, 227-6) configured to come into contact with outer surfaces of the pair of rotational shafts (226-1, 226-2) and to each have a wedge-shaped outer surface; and
a plurality of external pressurizing members (227-3, 227-4) having wedge-shaped inner surfaces to come into contact with the wedge-shaped outer surfaces of the internal pressurizing members (227-5, 227-6), and wherein when the external pressurizing members (227-3, 227-4) are moved in an axial direction of the rotational shafts (226-1, 226-2), the internal pressurizing members (227-5, 227-6) pressurize the rotational shafts (226-1, 226-2) in a radial direction so that the pair of rotational shafts (226-1, 226-2) are coupled.

9. The payload transportation device of claim 1, wherein the lift-driving portion comprises a lift-driving unit (210) configured to generate a rotational force to vertically lift the loading plate,
wherein at least one pair of rotational shafts (226-2, 226-3) configured to transmit the rotational force of the lift-driving unit (210) to the components included in the lift-driving portion (200) provided in the second assembly (2) are provided in the first assembly (1); and
wherein a second coupler (228) configured to absorb a deviation angle at which the pair of rotational shafts (226-2, 226-3) deviate from an axial direction while absorbing eccentricity of the pair of rotational shafts (226-2, 226-3) in a lateral direction perpendicular to the axial direction is connected between the pair of rotational shafts (226-2, 226-3).

10. The payload transportation device of claim 1, wherein the lift-driving portion comprises a lift-driving unit (210) configured to generate a rotational force to vertically lift the loading plate,
wherein rotational shafts (226-1, 226-2, 226-3) configured to transmit the rotational force of the lift-driving unit (210) to the components included in the lift-driving portion (200) provided in the second assembly (2) are provided in the first assembly (1), wherein a decelerator (223) configured to reduce a rotational speed transmitted from the rotational shafts (226-1, 226-2, 226-3) is provided in the second assembly (2), and
wherein the rotational shafts (226-1, 226-2, 226-3) are connected to a slide groove (223a) of the decelerator (2230) to transmit the rotational force while sliding in an axial direction.

11. The payload transportation device of claim 1, wherein the lift-driving portion comprises:
a lift-driving unit (210) configured to generate a rotational force to vertically lift the loading plate;
a first power transmission portion (230) in which cam members (232, 233) rotated by the rotational force of the lift-driving unit (210) and each including a cam protruding portion protruding from a position eccentric from a center and a guide groove in which the cam protruding portion is inserted are formed to apply a vertical lifting force to one side of a bottom of the loading plate due to lifting members (235, 236) linearly moving upward or downward when the cam members (232, 233) rotate and which is provided in the first assembly (1); and
a second power transmission portion (250) in which cam members (252, 253) rotated by the rotational force of the lift-driving unit (210) and each including a cam protruding portion protruding from a position eccentric from a center and a guide groove in which the cam protruding portion is inserted are formed to apply a vertical lifting force to the other side of the bottom of the loading plate due to lifting members (255, 256) linearly moving upward or downward when the cam members (252, 253) rotate and which is provided in the second assembly, and
wherein when the cam members (232, 233) and the cam members (252, 253) rotate 360 degrees, positions of the cam protruding portions of in the guide grooves vary.

12. The payload transportation device of claim 1, wherein a pair of first driven wheels (343a, 343b) are coupled to a bottom surface of the first assembly (1),
wherein a pair of second driven wheels (344a, 344b) are coupled to a bottom surface of the second assembly (2),
wherein the driven wheel (343a) on one side and the driven wheel (343b) on the other side, which are included in the pair of first driven wheels (343a, 344b), are pivotable about a driven wheel central shaft (345) having a length in a direction perpendicular to hinge shafts (350a, 350b), and
wherein the driven wheel (344a) on one side and the driven wheel (344b) on the other side, which are included in the pair of second driven wheels (344a, 344b), are pivotable about a driven wheel central shaft (346) having a length in a direction perpendicular to the hinge shafts (350a, 350b).

\* \* \* \* \*